(12) United States Patent
Obuchi et al.

(10) Patent No.: US 6,511,756 B1
(45) Date of Patent: Jan. 28, 2003

(54) THERMOPLASTIC DICYCLOPENTADIENE-BASE OPEN-RING POLYMERS, HYDROGENATED DERIVATIVES THEREOF, AND PROCESSES FOR THE PREPARATION OF BOTH

(75) Inventors: Kazuyuki Obuchi, Kawasaki (JP); Masaharu Tokoro, Kawasaki (JP); Teruhiko Suzuki, Kawasaki (JP); Hajime Tanisho, Kawasaki (JP); Kenji Otoi, Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/530,116

(22) PCT Filed: Oct. 22, 1998

(86) PCT No.: PCT/JP98/04788
§ 371 (c)(1),
(2), (4) Date: Apr. 24, 2000

(87) PCT Pub. No.: WO99/20676
PCT Pub. Date: Apr. 29, 1999

(30) Foreign Application Priority Data

| Oct. 23, 1997 | (JP) | ................................................ 9-309220 |
| Dec. 26, 1997 | (JP) | ................................................ 9-369481 |
| Jan. 30, 1998 | (JP) | ............................................... 10-034245 |
| Jan. 30, 1998 | (JP) | ............................................... 10-034246 |
| Jan. 30, 1998 | (JP) | ............................................... 10-034358 |
| Feb. 1, 1998 | (JP) | ............................................... 10-034275 |
| Feb. 2, 1998 | (JP) | ............................................... 10-035509 |

(51) Int. Cl.$^7$ ......................... B32B 27/32; B32B 27/30; C08G 61/08

(52) U.S. Cl. ............. 428/517; 156/244.11; 156/244.27; 264/173.12; 264/173.17; 428/462; 428/516; 428/520; 525/338; 526/141; 526/142; 526/169; 526/262; 526/279; 526/282; 526/283

(58) Field of Search .................... 156/244.11, 244.27; 264/173.12, 173.17; 428/462, 516, 517, 520; 525/338; 526/141, 142, 169, 262, 279, 282, 283

(56) References Cited

U.S. PATENT DOCUMENTS

| 3,549,607 A | 12/1970 | Natta .......................... 260/93.1 |
| 3,816,384 A | 6/1974 | Streck et al. ................ 260/677 |
| 4,469,809 A | 9/1984 | Klosiewicz ................... 502/117 |
| 6,310,160 B1 * | 10/2001 | Kodemura ................... 526/281 |

FOREIGN PATENT DOCUMENTS

| DE | 29 22 235 A1 | 12/1980 |
| EP | 0 784 066 A1 | 7/1997 |

(List continued on next page.)

OTHER PUBLICATIONS

"Ring opening polymerization of endo and exo dicyclopentadiene and their 7,8–dihydro derivatives", Hamilton, J. G., Ivin, J., and Rooney, J.J., Journal of Molecular Catalysis, vol. 36, 1986, pp. 115–125, XP00098523.

"N.m.r. Spectra of Ring–opended Polymers of 1–Methylbicyclo [2.2.1]hept–2–ene and their hydrogenated Products", Hamilton, J. G., Ivin, J., and Rooney, J.J., British Polymer Journal, vol. 16, Mar. 1984, pp. 21–33, XP000997857.

*Primary Examiner*—D. S. Nakarani
(74) *Attorney, Agent, or Firm*—Armstrong, Westerman & Hattori, LLP

(57) ABSTRACT

A thermoplastic dicyclopentadiene ring-opening polymer obtained by ring-opening polymerization of a monomer component containing a dicyclopentadiene monomer, characterized in that polycyclic rings which are repeating units of the polymer are bonded in cis-position relative to the carbon-carbon double bond of the main chain of the polymer in 50 mol % or more of the repeating units based on the total repeating units and the content of a low-molecular weight component of 2,000 or less in molecular weight is 10% by weight or less based on the total polymer components, and a hydrogenation product obtained by hydrogenating the carbon-carbon unsaturated bond of the thermoplastic dicyclopentadiene ring-opening polymer.

23 Claims, 2 Drawing Sheets

FOREIGN PATENT DOCUMENTS

| | | |
|---|---|---|
| EP | 0 875 889 A1 | 11/1998 |
| JP | 43-7552 | 3/1968 |
| JP | 47-598 | 1/1972 |
| JP | 47-18991 | 9/1972 |
| JP | 49-41495 | 4/1974 |
| JP | 52-45696 | 4/1977 |
| JP | 64-81818 | 3/1989 |
| JP | 4-283202 | 10/1992 |
| JP | 5-86172 | 4/1993 |
| JP | 5-345817 | 12/1993 |
| JP | 06 255053 | 9/1994 |
| JP | 7-102043 | 4/1995 |
| WO | WO98/14499 * | 4/1998 |

* cited by examiner

THERMOPLASTIC DICYCLOPENTADIENE-BASE OPEN-RING POLYMERS, HYDROGENATED DERIVATIVES THEREOF, AND PROCESSES FOR THE PREPARATION OF BOTH

TECHNICAL FIELD

The present invention relates to thermoplastic dicyclopentadiene ring-opening polymers and a method for producing the same, and, more particularly, to thermoplastic dicyclopentadiene ring-opening polymers excellent in hydrogenation efficiency after ring-opening polymerization and capable of providing hydrogenation products excellent in mechanical strength; hydrogenation products thereof; and a method for producing dicyclopentadiene ring-opening polymers which is excellent in conversion and can diminish the amount of catalysts used.

Furthermore, the present invention relates to wire coating materials comprising cyclic olefin polymers, and, more particularly, to wire coating materials excellent in flexing resistance and flexibility, and wires comprising a conductor around which said wire coating material is provided, such as high-voltage power cables and high frequency cables.

Moreover, the present invention relates to plate lenses formed of thermoplastic resins having an alicyclic structure, and, more particularly, to plate lenses made of thermoplastic hydrocarbon resins excellent in mechanical strength, impact strength and transparency, and a method for producing the same.

In addition, the present invention relates to agricultural films excellent in mechanical strength, elongation, chemical resistance, weathering resistance and light transmission.

Further, the present invention relates to composite films excellent in mechanical strength and chemical resistance, and, besides, in gas barrier properties and water vapor barrier properties, and a method for producing the same.

Moreover, the present invention relates to food packaging films excellent in mechanical strength, elongation, oil resistance, transparency and water vapor barrier properties.

Furthermore, the present invention relates to impact-resistant plate members excellent in mechanical strength, elongation, chemical resistance, weathering resistance and light transmission, and, more particularly, to impact-resistant plate members excellent in transparency and suitable for outdoor use.

BACKGROUND ART

Thermoplastic dicyclopentadiene ring-opening polymers and hydrogenation products thereof are excellent in balancing of various properties such as heat resistance, transparency, water resistance (water absorption resistance, moisture resistance), chemical resistance, solvent resistance, dielectric characteristics (low dielectric constant, low dielectric loss), low birefringence, and stiffness. Therefore, they are used in a wide variety of fields, for example, as optical materials, medical equipment, electrical insulating materials, and electronic part processing materials which are made by various molding methods such as injection molding, extrusion molding, compression molding and solvent-casting.

Thermoplastic dicyclopentadiene ring-opening polymers can be obtained by subjecting dicyclopentadiene (hereinafter referred to as "DCP") or derivatives thereof (hereinafter referred to as "DCP monomers" including both the DCP and derivatives thereof) in a suitable solvent in the presence of a ring-opening polymerization catalyst such as a metathesis catalyst. Hydrogenation products thereof can be obtained by hydrogenating carbon-carbon unsaturated bonds (such as carbon-carbon double bonds in main chains and polycyclic rings) in thermoplastic DCP ring-opening polymers. Hydrogenation of thermoplastic DCP ring-opening polymers to saturate the carbon-carbon unsaturated bonds results in improvement of various properties such as heat resistance, weathering resistance, light resistance, solvent resistance, chemical resistance and water resistance. Thermoplastic DCP ring-opening polymers can also be obtained by subjecting a DCP monomer and other ring-opening copolymerizable norbornene monomer to ring-opening copolymerization in the presence of a ring-opening polymerization catalyst. In this case, heat resistance, mechanical properties, etc. can be improved by selecting kind and copolymerization ratio of the other norbornene monomers used as comonomers. The resulting ring-opening copolymers can be hydrogenated, if necessary.

In general, DCP ring-opening polymers can be roughly classified into thermoplastic DCP ring-opening polymers and curing type DCP ring-opening polymers. The curing type DCP ring-opening polymers are obtained by bulk ring-opening polymerization reaction using polymerization catalysts of relatively high activity, such as tungsten-based ring-opening polymerization catalysts or molybdenum-based ring-opening polymerization catalysts. The curing type DCP ring-opening polymers are used for making molded products by reactive injection molding (RIM) method using DCP monomers (e.g., JP-A-58-127728, JP-A-58-129013, JP-A-4-226114, JP-A-6-145247, etc.). In the case of producing curing type DCP ring-opening polymers, generally, a reaction mixture containing a DCP monomer and a ring-opening polymerization catalyst is injected into a mold to carry out bulk ring-opening polymerization, and, hence, they can be obtained as molded products of a given shape after completion of the polymerization reaction. Thus, as for curing type DCP ring-opening polymers, since molded products can be obtained without employing melt molding methods (e.g., injection molding, extrusion molding and compression molding), no problems are caused even if the ring-opening polymerization is carried out under such conditions that there takes place an abrupt reaction at the time of the bulk ring-opening polymerization or there take place an intermolecular and/or intramolecular crosslinking reactions caused by the carbon-carbon double bond in the main chain or side chain produced by the ring-opening reaction. Therefore, in the production of heat-curing type DCP ring-opening polymers, ring-opening polymerization catalysts of high activity are selected and used for shortening the reaction time in the mold, whereby crosslinked cured polymers are obtained.

On the other hand, titanium-based ring-opening polymerization catalysts have been mainly used for the production of thermoplastic DCP ring-opening polymers (e.g., JP-B-58-43412 and JP-A-7-220230). However, in the conventional production methods using titanium-based ring-opening polymerization catalysts, the resulting polymers have a problem in solubility, and if aromatic hydrocarbon solvents such as toluene high in dissolvability for polymers are used, the solvents are also hydrogenated at the time of hydrogenation reaction and thus efficiency of the hydrogenation reaction is deteriorated. Furthermore, according to the above methods, since ring-opening polymerization activity is low, there are problems that conversion of polymerization does not increase, ring-opening polymerization catalysts must be used in a large amount, wastes of catalyst residues are produced in large quantity, and productivity is low.

JP-A-63-218727 and JP-A-7-41549 disclose methods for ring-opening polymerization of DCP monomers using tungsten-based ring-opening polymerization catalysts. These methods have the merits that conversion is high and the ring-opening polymerization catalysts can be used in a small amount, but have the following problems, namely, a part of carbon-carbon double bonds are crosslinked to result in gelation at the time of the ring-opening polymerization to make it difficult to separate the resulting polymer from the reaction mixture and dry it; the subsequent hydrogenation reaction does not efficiently proceed owing to the high viscosity of the reaction mixture; and molded products obtained from the resulting ring-opening polymers or hydrogenation products thereof are inferior in mechanical strength. Further problem is that when the hydrogenation products are extrusion molded or injection molded, the pellets adhere to the lower part of the hopper (bridging in the hopper) to cause clogging of the hopper.

As mentioned above, hitherto, there have been known no thermoplastic DCP ring-opening polymers which are high in productivity in polymerization, hardly leave wastes of catalyst residues, are high in activity of the subsequent hydrogenation reaction, and are excellent in moldability when used as molding materials after hydrogenation reaction, and no methods for producing the same have been known.

An object of the present invention is to provide thermoplastic DCP ring-opening polymers which are high in productivity in polymerization, hardly leave wastes of catalyst residues, are high in activity of the subsequent hydrogenation reaction, and are excellent in moldability when used as molding materials after hydrogenation reaction, and a method for producing the same.

Another object of the present invention is to provide materials having well-balanced excellent flexing resistance, flexibility and strength characteristics sufficient as wire coating materials with maintaining excellent dielectric characteristics, water tree resistance and endurance possessed by amorphous polyolefins.

Further object of the present invention is to provide plate lenses made of thermoplastic resins excellent in transparency, mechanical strength, impact strength and molding processability and small in change due to moisture absorption, and a method for producing the same.

Further another object of the present invention is to provide agricultural films excellent in mechanical strength, elongation, chemical resistance, weathering resistance and light transmission, and comprising resins containing no halogen atoms such as chlorine atom.

Still another object of the present invention is to provide composite films excellent in mechanical strength and chemical resistance, and, besides, in gas barrier properties and water vapor barrier properties, and a method for producing the same.

Further object of the present invention is to provide food packaging films excellent in mechanical strength, elongation, oil resistance, transparency and water vapor barrier properties.

Still further object the present invention is to provide impact-resistant plate members excellent in mechanical strength, elongation, chemical resistance, weathering resistance and light transmission.

DISCLOSURE OF INVENTION

As a result of research conducted by the inventors, it has been found that according to the conventional solution polymerization of DCP monomers using tungsten-based ring-opening polymerization catalysts, gelation is apt to occur at the time of ring-opening polymerization and, besides, low-molecular weight components (namely, oligomers) of 2,000 or less in molecular weight are apt to be produced, and, hence, the resulting thermoplastic DCP ring-opening polymers are deteriorated in mechanical strength.

As a result of further research conducted by the inventors, it has been found that in a method for the production of thermoplastic dicyclopentadiene ring-opening polymers by ring-opening polymerization of dicyclopentadiene monomers in the presence of ring-opening polymerization catalysts such as tungsten-based ring-opening polymerization catalysts, production of gel and low-molecular weight components can be considerably inhibited by allowing at least one compound selected from the group consisting of a nitrile, a ketone, an ether and an ester to be present as a reaction regulator. According to the method of the present invention, since not only the production of the crosslinked polymer component, but also the production of low-molecular weight component can be effectively inhibited, thermoplastic DCP ring-opening polymers excellent in productivity, moldability, mechanical strength, and hydrogenation efficiency can be obtained.

In the thermoplastic DCP ring-opening polymers of the present invention, the proportion of repeating units in which polycyclic rings are bonded in cis-position relative to the carbon-carbon double bond of the main chain is 50 mol % or more and the content of a low-molecular weight component of 2,000 or less in molecular weight is low, namely, 10% by weight or less. The thermoplastic DCP ring-opening polymers of the present invention are soluble in saturated hydrocarbon solvents and, hence, can be efficiently hydrogenated and hydrogenation products excellent in mechanical strength can be obtained.

It has been further found that by using the hydrogenation products of the present invention, there can be obtained wire coating materials excellent in elongation, impact strength, etc; plate lenses which are hardly broken even when thinned in wall and thus can be reduced in weight and be made large-sized, excellent in tenacity and hence can be adapted to curved picture surface, can be highly miniaturized, and, besides, are small in deterioration of optical performance; agricultural films excellent in all of the characteristics of mechanical strength, elongation, chemical resistance, weathering resistance and light transmission; composite films excellent in mechanical strength and chemical resistance, and, besides, in gas barrier properties and water vapor barrier properties; food packaging films excellent in mechanical strength, elongation, oil resistance, transparency and water vapor barrier properties; and impact-resistant plate members excellent in all of the characteristics of mechanical strength, elongation, chemical resistance, weathering resistance and light transmission.

The present invention has been accomplished based on these findings. Thus, according to the present invention, the following are provided.

That is, the present invention is a thermoplastic dicyclopentadiene ring-opening polymer obtained by ring-opening polymerization of a monomer component containing a dicyclopentadiene monomer, characterized in that polycyclic rings which are repeating units of the polymer are bonded in cis-position relative to the carbon-carbon double bond in the main chain in a proportion of 50 mol % or more of the total repeating units and the content of a low-molecular weight component of 2,000 or less in molecular weight is 10% by weight or less based on the total polymer components.

Furthermore, the present invention is a method for producing a thermoplastic dicyclopentadiene ring-opening polymer by ring-opening polymerization of a monomer component containing a dicyclopentadiene monomer in the presence of a ring-opening polymerization catalyst, characterized in that the ring-opening polymerization is carried out in the presence of at least one compound selected from the group consisting of a nitrile, a ketone, an ether and an ester as a reaction regulator.

Furthermore, the present invention relates to a hydrogenation product obtained by hydrogenating the carbon-carbon unsaturated bond of the above thermoplastic dicyclopentadiene ring-opening polymer.

Furthermore, the present invention relates to a wire coating material containing the hydrogenation product.

Furthermore, the present invention relates to a plate lens containing the hydrogenation product.

Furthermore, the present invention relates to an agricultural film containing the hydrogenation product.

Furthermore, the present invention relates to a composite film containing at least one layer of film (A) comprising the above hydrogenation product and at least one layer of film (B) comprising a polyvinyl alcohol-based polymer.

Furthermore, the present invention relates to a food packaging film containing the hydrogenation product.

Furthermore, the present invention relates to an impact resistant plate member containing the hydrogenation product.

Figure 1:
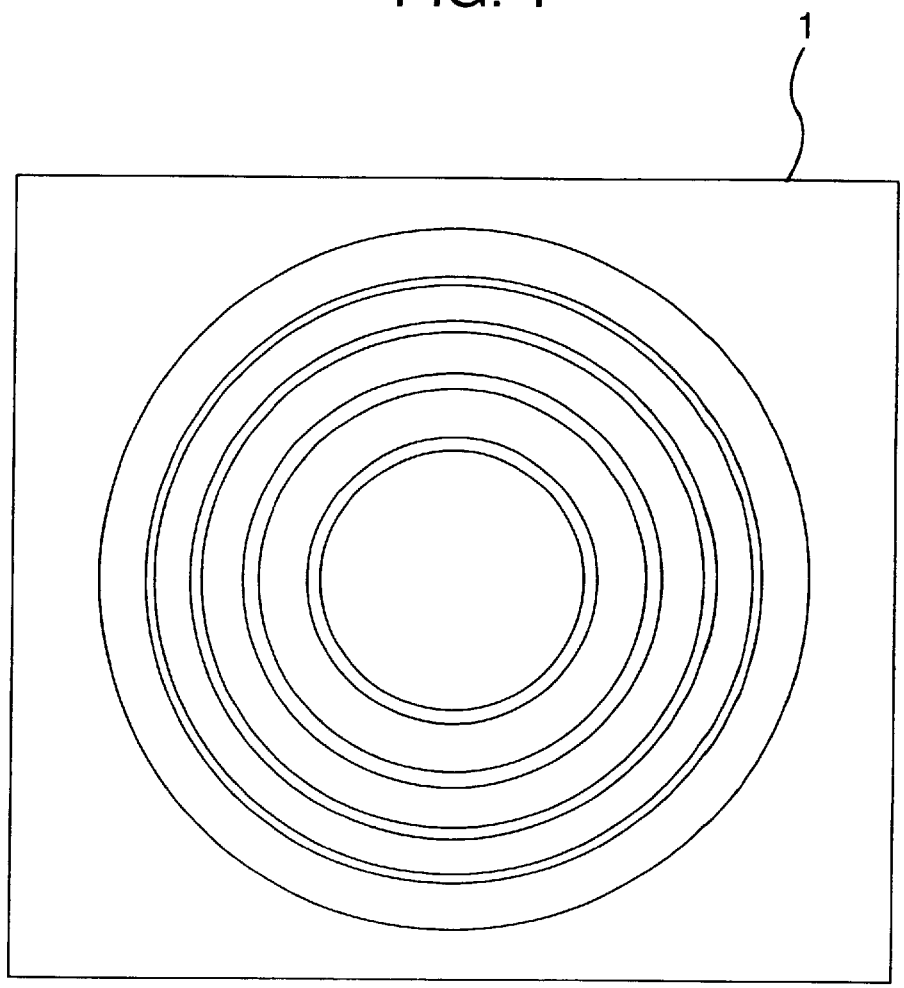
FIG. 1 is a plan view of a Fresnel lens containing the hydrogenation product of the present invention.

BEST MODE FOR CARRYING OUT THE INVENTION (Thermoplastic DCP Ring-opening Polymer)

When a DCP monomer [formula (1) given hereinafter] is ring-opening polymerized, there are produced repeating units [formulas (7) and (9) given hereinafter] in which a polycyclic ring (a condensed polycyclic ring comprising two 5-membered rings) bonds in trans-position relative to carbon-carbon double bond in the main chain and repeating units [formulas (8) and (10) given hereinafter] in which the polycyclic ring bonds in cis-position.

In the thermoplastic DCP ring-opening polymer of the present invention, the proportion of repeating units in which a polycyclic ring bonds in the cis-position relative to the carbon-carbon double bond in the main chain (hereinafter referred to as "cis-bond unit") is 50 mol % or more, preferably 60 mol % or more, more preferably 65 mol % or more. The upper limit of the cis-bond unit is usually 95 mol %, mostly about 85 mol %. The remainder comprises trans-bond unit. When the cis-bond unit is present within the above range, the thermoplastic DCP ring-opening polymer dissolves in a saturated hydrocarbon solvent and the hydrogenation reaction can be efficiently carried out.

In the thermoplastic DCP ring-opening polymer of the present invention, content of a low-molecular weight component of 1,000 or less, preferably 2,000 or less in molecular weight is 10% by weight or less, preferably 5% by weight or less, more preferably 2% by weight or less based on the total polymer component. The molecular weight here means a number-average molecular weight (Mn) in terms of polyisoprene measured by gel permeation chromatography (hereinafter sometimes referred to as "GPC") using cyclohexane as a solvent. As the low-molecular weight components in the present invention, mention may be made of compounds which become cyclic upon bonding of both the ends of polymers formed by growing of cyclic olefin bond units.

Since the thermoplastic DCP ring-opening polymer of the present invention is considerably small in the content of low-molecular weight component (oligomer), it is excellent in mechanical strength and the hydrogenation product thereof is also excellent in mechanical strength. Furthermore, since the thermoplastic DCP ring-opening polymer and the hydrogenation product thereof of the present invention are small in the content of oligomer, when pellets thereof are injection molded or extrusion molded, bridging does not occur at the lower part of hopper and the hopper is not clogged with pellets, and, accordingly, molding operability is superior. There is no special lower limit of the content of low-molecular weight component, but it is preferably 0.2% by weight. When the content of low-molecular weight component is within the range of 0.2% by weight or more, flexibility, molding processability and mechanical strength of the resulting ring-opening polymers and hydrogenation products thereof are highly well balanced, and the range is preferred.

When the hydrogenation product of the thermoplastic DCP ring-opening polymer of the present invention is used for plate glass, the content of low-molecular weight component of 2,000 or less in molecular weight is preferably 10% by weight or less, more preferably 5% by weight or less based on the total polymer component. Too much content of the oligomer in the thermoplastic hydrocarbon resin causes deterioration of characteristics such as mechanical strength, impact strength, and solvent resistance of the resulting plate lens made of the thermoplastic hydrocarbon resin.

The thermoplastic DCP ring-opening polymer of the present invention contains substantially no gel and hence is high in quality, is easy in removal of foreign substances, and, besides, can be easily hydrogenated and is high in hydrogenation efficiency.

The thermoplastic DCP ring-opening polymer of the present invention has a number-average molecular weight (Mn) of usually 3,000–200,000, preferably 5,000–100,000 in terms of polyisoprene measured by gel permeation chromatography (GPC) using cyclohexane as a solvent.

When the hydrogenation product of the thermoplastic DCP ring-opening polymer in the present invention is used as a resin wire coating material, the number-average molecular weight (Mn) of the ring-opening polymer in terms of polyisoprene is preferably 10,000–100,000, more preferably 15,000–80,000, most preferably 20,000–50,000. When the molecular weight of the polymer is within the above range, since elongation and impact strength of the ring-opening polymer are superior, flexing resistance, flexibility, molding processability (flow characteristics, viscosity characteristics), and strength characteristics are markedly improved.

When the hydrogenation product of the thermoplastic DCP ring-opening polymer in the present invention is used as a plate lens, the number-average molecular weight (Mn) of the ring-opening polymer in terms of polyisoprene is preferably 3,000–100,000, more preferably 5,000–80,000, most preferably 10,000–40,000. Weight-average molecular weight (Mw) of the ring-opening polymer is preferably 5,000–200,000, more preferably 10,000–100,000, most preferably 20,000–70,000. When the molecular weight of the polymer is within the above ranges, optical characteristics, mechanical strength, impact strength, processability, low water absorption, and low adsorbability of the resulting plate lenses are highly balanced and this is preferred.

The ratio of the weight-average molecular weight (Mw) and the number-average molecular weight (Mn) in terms of polyisoprene measured by GPC using cyclohexane as a solvent, namely, molecular weight distribution (Mw/Mn), of the thermoplastic DCP ring-opening polymer of the present invention is within the range of usually 1.5–5.0, preferably 1.7–4.0, more preferably 1.8–3.0.

When the hydrogenation product of the thermoplastic DCP ring-opening polymer in the present invention is used as a plate lens, the molecular weight distribution is usually 3.5 or less, preferably 3.0 or less, more preferably 2.5 or less, and usually 1.0 or more, preferably 1.5 or more. When the Mw/Mn is within the above ranges, mechanical strength, impact strength, processability, etc. of the resulting plate-like lenses are highly balanced and this is preferred.

The thermoplastic DCP ring-opening polymer of the present invention has a glass transition temperature (Tg) of usually 50–150° C., preferably 60–130° C.

When used as a wire coating material, the glass transition temperature is 60–220° C., preferably 70–200° C., more preferably 80–190° C.

The hydrogenation product of the thermoplastic DCP ring-opening polymer of the present invention also has the same characteristics as those of the ring-opening polymer mentioned above.

(Monomers)

The DCP monomers used in the present invention are dicyclopentadiene or derivatives thereof represented by the following formula (1):

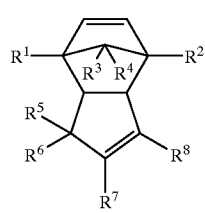

(1)

[wherein $R^1$–$R^8$ independently one another are each hydrogen atom, hydrocarbon group, halogen atom, hydroxyl group, ester group, alkoxy group, cyano group, amido group, imido group, silyl group, or hydrocarbon group substituted with a polar group (namely, halogen atom, hydroxyl group, ester group, alkoxy group, cyano group, amido group, imido group or silyl group)].

In the formula (1), as the hydrocarbon groups, mention may be made of, for example, alkyl groups of 1–20, preferably 1–10, more preferably 1–6 carbon atoms; alkenyl groups of 2–20, preferably 2–10, more preferably 2–6 carbon atoms; alkynyl groups of 2–20, preferably 2–10, more preferably 2–6 carbon atoms; alkylidene groups of 2–20, preferably 2–10, more preferably 2–6 carbon atoms; cycloalkyl groups of 3–15, preferably 3–8, more preferably 5–6 carbon atoms; and aromatic hydrocarbon groups of 6–20, preferably 6–16, more preferably 6–10 carbon atoms.

As the halogen atoms, mention may be made of fluorine atom, chlorine atom, bromine atom, and iodine atom. As the ester groups, mention may be made of alkyl ester groups of 1–20, preferably 1–10, more preferably 1–6 carbon atoms. As the alkoxy groups, mention may be made of alkoxy groups of 1–20, preferably 1–10, more preferably 1–6carbon atoms. As the hydrocarbon groups substituted with polar groups, mention may be made of, halogenated alkyl groups of 1–20, preferably 1–10, more preferably 1–6 carbon atoms.

Among the DCP monomers, dicyclopentadienes represented by the following formula (2) are preferred from the viewpoints of easy availability, ring-opening polymerization reactivity and properties.

(2)

The DCP monomers can be used each alone or in combination of two or more. Furthermore, the DCP monomers can be used alone, but, if necessary, ring-opening copolymerizable other norbornene monomer can be used in combination as a minor component.

The other norbornene monomers which are ring-opening copolymerizable with the DCP monomers include, for example, polycyclic hydrocarbons having norbornene structure; their substitution derivatives with alkyl, alkenyl, alkylidene and aromatic groups; their substitution derivatives with polar groups such as halogen, hydroxyl group, ester group, alkoxy group, cyano group, amido group, imido group and silyl group; and their substitution derivatives with alkyl, alkenyl, alkylidene and aromatic groups having these polar groups. Among them, polycyclic hydrocarbons having norbornene structure and their substitution derivative with alkyl, alkenyl, alkylidene and aromatic groups are suitable because of their excellent chemical resistance and moisture resistance.

Examples of the other norbornene monomers are norbornene, its substitution derivatives such as 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, and 5-phenyl-5-methyl-2-norbornene; dimethanooctahydronaphthalene and its substitution derivatives similar to those enumerated above, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; adducts of cyclopentadiene with tetrahydroindene or the like and their substitution derivatives similar to those enumerated above, such as 1,4-dimethano-1,4,4a,4b,5,8,8a,9a-octahydrofluorene and 5,8-methano-1,2,3,4,4a,5,8,8a-octahydro-2,3-cyclopentadienonaphthalene; polymers of cyclopentadiene and their substitution derivatives similar to those enumerated above, such as 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene; 1,4-methano- 1,4,4a,4b,5,8,8a,9a-octahydrofluorene and its substitution derivatives similar to those enumerated above; 1,4-methano-1,4,4a,9a-tetrahydrofluorene and its substitution derivatives similar to those enumerated above, such as 1,4-methano-8-methyl-1,4,-4a,9a-tetrahydrofluorene, 1,4-methano-8-chloro-1,4,4a,9a-tetrahydrofluorene and 1,4-methano-8-bromo-1,4,4a,9a-tetrahydrofluorene; 1,4-methano-1,4,4a,9a-tetrahydrobenz6furan and its substitution derivatives similar to those enumerated above; 1,4-methano-9-phenyl-1,4,4a,9a-tetrahydrocarbazole and its substitution derivatives similar to those enumerated above; 1,4-methano-1,4,4a,5,10,10a-hexahydroanthracene and its substitution derivatives similar to those enumerated above; and 7,10-methano-6b,7,10,10a-tetrahydrofluoranthene and its substitution derivatives similar to those enumerated above. These norbornene monomers can be used each alone or in combination of two or more.

The object of the present invention is to inhibit production of oligomers in a large amount in ring-opening polymerization of DCP monomers. The other norbornene monomers which are ring-opening copolymerizable with DCP monomers are used in a small amount to improve or modify the various properties of DCP ring-opening polymers. Therefore, the other norbornene monomers are used in an amount of usually 40% by weight or less, preferably 30% by weight or less based on the total monomers. When the content is within the above range, in case the hydrogenation products of the ring-opening polymers are used as resin wire coating materials, flexing resistance, flexibility, mechanical characteristics and processability of the polymers are highly balanced and this is suitable, and when they are used as plate lenses, mechanical strength, elongation and light transmission are highly balanced and this is suitable.

For modification of molecular weight in ring-opening polymerization, for example, chain monoolefins or chain non-conjugated dienes such as 1-butene, 1-pentene, 1-hexene, 1-octene, 2-butene, 2-pentene and 1,4-hexadiene may be added in an amount of at most 10 mol % based on the total monomers.

As the chain repeating units, those represented by, for example, the formula (3) can also be used.

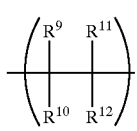

(3)

In the formula (3), $R^9$–$R^{12}$ are the same as $R^1$ in the formula (1), and preferably hydrogen atom.

When the hydrogenation products of the DCP ring-opening polymers in the present invention are used as resin wire coating materials, it is preferred from the point of improving effect of flexing resistance, flexibility and mechanical characteristics to use ring-opening polymers of dicyclopentadiene with other monomers having norbornene ring (norbornene monomers) such as tetracyclododecene monomers and norbornene monomers, and addition copolymers of dicyclopentadiene, other monomers having norbornene ring (norobornene monomer) and α-olefins.

Further, when the hydrogenation products of the DCP ring-opening polymers in the present invention are used as plate lenses, they may have repeating units having norbornane ring as other norbornene monomers. The structure of the monomers has no special limitation, but mention may be made of, for example, the compounds represented by the formula (4).

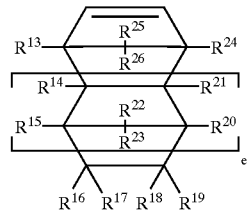

(4)

Examples and preferred scope of $R^{13}$–$R^{26}$ in the formula (4) are the same as those of $R^1$ in the formula (1). The letter "e" in the formula (4) denotes an integer of 1–3, preferably 1.

Among the monomers represented by the formula (4), preferred are those represented by the formula (5), and more preferred are those represented by the formula (6).

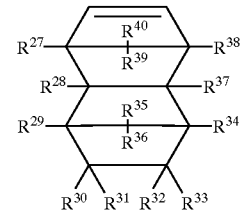

(5)

Examples and preferred scope of $R^{27}$–$R^{40}$ in the formula (5) are the same as those of $R^1$ in the formula (1).

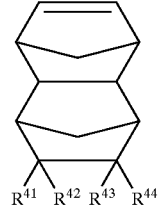

(6)

Examples and preferred scope of $R^{41}$–$R^{44}$ in the formula (6) are the same as those of $R^1$ in the formula (1).

These repeating units having norbornane ring are used each alone or in combination of two or more. Content of the repeating units having norbornane ring has no special limitation, but is preferably 0–40% by weight, more preferably 0–30% by weight.

(Ring-opening Polymerization)

In the method for producing thermoplastic DCP ring-opening polymers by ring-opening polymerization of DCP monomers in the presence of ring-opening polymerization catalysts according to the present invention, the ring-opening polymerization is carried out in the presence of at least one compound selected from the group consisting of nitrites, ketones, ethers and esters as a reaction regulator.

The DCP monomers have two carbon-carbon double bonds in the polycyclic structure. Since the ring-opening polymers produced by ring-opening polymerization of the DCP monomers also have carbon-carbon bond in a 5-membered ring of main chain and side chain, there is the problem that the ring-opening polymers produced are apt to crosslink at the time of ring-opening polymerization. It has been found that if crosslinked polymer is present in a large amount in the ring-opening polymer, this adversely affects various properties and, besides, hydrogenation efficiency in the hydrogenation step lowers.

It has further been found that according to the conventional methods, oligomers are sometimes produced in a considerable amount. It has also been found that oligomers of DCP monomers usually have a cyclic structure and mainly cyclic oligomers of heptamer are produced as by-products. If content of the oligomers is high, when pellets of the produced ring-opening polymers or hydrogenation products thereof are injection molded or extrusion molded, there is caused the problem that bridging occurs in the lower part of a hopper of molding machine to clog the hopper with the pellets. Moreover, ring-opening polymers containing a large amount of oligomers or hydrogenation products thereof are deteriorated in mechanical strength. According to the method of the present invention, these problems are solved.

Ring-opening Polymerization Catalysts

As ring-opening polymerization catalysts, mention may be made of, for example, (1) a catalyst system comprising a halide, nitrate or acetylacetone compound of a metal such as ruthenium, rhodium, palladium, osmium, iridium or platinum and a reducing agent, and (2) a catalyst system comprising a halide or acetylacetone compound of a metal such as titanium, vanadium, zirconium, tungsten, molybdenum or rhenium and an organoaluminum compound. Among them, preferred is a metathesis catalyst system comprising a metathesis polymerization catalyst (transition metal compound) and an organoaluminum compound (activator).

Examples of the metathesis polymerization catalysts are tungsten halides such as $WCl_6$, $WCl_5$, $WCl_4$, $WCl_2$, $WBr_6$, $WBr_4$, $WBr_2$, $WF_6$, $WF_4$, $WI_6$, and $WI_4$; tungsten oxyhalides such as $WOCl_4$, $WOBr_4$ and $WOF_4$; alkoxylated tungsten or aryloxylated tungsten such as $W(OC_6H_5)_6$; partially halogenated alkoxylated tungsten or partially chlorinated aryloxylated tungsten such as $WCl_2(OC_6H_5)_4$; (partially) carbonylated, (partially) chlorinated, (partially) halogenated, (partially) alkoxylated or (partially) aryloxylated tungsten compounds such as $W(CO)_3(CH_3CN)_3$, $W(OC_2H_5)_2Cl_3$, $(CO)_5WC(OCH_3)(CH_3)$, $(CO)_5WC(OC_2H_5)(CH_3)$, and $(CO)_5WC(OC_2H_5)(C_4H_5)$; molybdenum compounds similar to these tungsten compounds [such as $MoCl_5$, $MoCl_4$, $MoCl_3$, $MoBr_4$, $MoBr_3$, $MoBr_2$, $MoF_4$, $MoOCl_3$, $MoOF_3$, $Mo(OC_2H_5)_2Cl_3$, $MO(OC_2H_5)_5$, $MoO_2(acac)_2$, $Mo(CO)_6$, and $(CO)_5MOC(OC_2H_5)(CH_3)$]; rhenium compounds similar to the above tungsten compounds [such as $ReCl_3$, $ReOCl_3$, $ReOBr_3$, $Re_2(CO)Cl_6$, and $ReOBr_3 P(C_6H_5)_3$]; vanadium compounds similar to the above tungsten compounds (such as $VCl_4$, $VOCl_3$ and $VOBr_3$]; titanium compounds similar to the above tungsten compounds [such as $TiCl_5$, $TiCl_4$, $TiCl_3$, $TiBr_4$, $TiBr_3$, $TiBr_2$ and $Ti(OC_2H_5)_2Cl_3$]; and the like.

Among these metathesis polymerization catalysts, preferred compounds having high polymerization activity are halogenated or partially alkoxylated (or aryloxylated) and halogenated tungsten compounds or molybdenum compounds such as $MoCl_5$, $Mo(OC_2H_5)_2Cl_3$, $WCl_6$ and $W(OC_2H_5)_2Cl_3$. Among them, halogenated or partially alkoxylated (or aryloxylated) and halogenated tungsten compounds $WCl_6$ and $W(OC_2H_5)_2Cl_3$ are especially preferred because polymerization activity is high and ring-opening polymers of high molecular weight and hydrogenation products thereof can be easily obtained.

These transition metal compounds can be used each alone or in combination of two or more. Amount of them is usually 0.001–10 mols, preferably 0.005–5 mols, more preferably 0.01–2 mols based on 100 mols of the total monomers.

As the organoaluminum compounds, mention may be made of, for example, triethylaluminum, tri-n-propylaluminum, triisopropylaluminum, tri-n-butylaluminum, tri-i-isobutylaluminum, trihexylaluminum, trioctylaluminum, tridecylaluminum, triphenylaluminum, tribenzylaluminum, di-i-butylaluminum-mono-i-butyl oxide, and di-n-propylaluminum monochloride.

These organoaluminum compounds may be used each alone or combination of two or more. Amount of the organoaluminum compounds used is suitably selected depending on the reaction conditions, but is usually 1:1–1:1000, preferably 1:2–1:100, more preferably 1:5–1:50 in metallic atom ratio of transition metal compound:organoaluminum compound.

Reaction Regulators

In the present invention, specific reaction regulators are used in order to inhibit the production of low molecular weight components (oligomers, especially cyclic oligomers). That is, at least one compound selected from the group consisting of nitries, ketones, ethers and esters is allowed to be present in the reaction system as reaction regulators.

The nitrites are compounds represented by the formula RCN, and R is a hydrocarbon group such as an alkyl group or an aryl group. The alkyl groups include those of 1–20, preferably 3–15, more preferably 4–10 carbon atoms. Preferred are, for example, i-propyl group, t-butyl group, n-pentyl group, t-pentyl group, hexyl group, heptyl group and octyl group. Examples of the aryl groups are phenyl group, alkyl-substituted phenyl groups (such as tolyl group and xylyl group), naphthyl group and alkyl-substituted naphthyl groups. Preferred examples of the nitrites are t-butylnitrile and benzonitrile.

The ketones are compounds represented by the formula R—C(=O)—R', and R and R' are hydrocarbon groups such as alkyl group and aryl group. Carbon number of the alkyl group is usually 1–20, preferably 1–10. As the aryl groups, phenyl group is preferred. Preferred examples of the ketones are acetone, methyl ethyl ketone, methyl isobutyl ketone and methyl phenyl ketone.

The ethers are compounds represented by the formula R—O—R', and R and R' are hydrocarbon groups such as alkyl group and aryl group. Carbon number of the alkyl group is usually 1–20, preferably 1–10. As the aryl group, phenyl group is preferred. Examples of the ethers are dimethyl ether, diethyl ether, methylethyl ether, methylphenyl ether and isopropyl ether.

The esters are compounds represented by the formula R—COO—R', and R and R' are hydrocarbon groups such as alkyl group and aryl group. Carbon number of the alkyl group is usually 1–20, preferably 1–10. As the aryl group, phenyl group is preferred. Examples of the esters are methyl acetate, ethyl acetate, isopropyl acetate, butyl acetate, methyl propionate, ethyl propionate, butyl propionate, methyl butyrate, ethyl butyrate, isopropyl butyrate, butyl butyrate, methyl benzoate and ethyl benzoate.

These reaction regulators may be used each alone or in combination of two or more. Amount of the reaction regulators used is optionally selected depending on the reaction conditions, but is usually 0.001–10 mols, preferably 0.005–5 mols, more preferably 0.01–2 mols based on 100 mols of the total monomers.

In the production method of the present invention, an alcohol can be additionally used in combination as a metathesis polymerization activity regulator (reaction regulator). Examples of the alcohol are ethanol, propanol, isopropanol, butanol, isobutanol, sec-butanol, pentanol, hexanol, octanol, decanol, cyclopentanol, cyclohexanol, phenol and benzyl alcohol. Of these alcohols, preferred are propanol, isopropanol, butanol, isobutanol, pentanol and phenol.

These alcohols can be used each alone or in combination of two or more. Amount of the alcohol is optionally selected depending on the reaction conditions, but is usually 1:0–1:100, preferably 1:0–1:10, more preferably 1:0–1:6 in the molar ratio of metathesis polymerization catalyst:alcohol. Since the alcohol has the effect to lower the polymerization activity of the metathesis polymerization catalysts, the amount of the alcohol must be selected depending on the kind of the metathesis polymerization catalysts.

Furthermore, since the organoaluminum compound as a reaction activator and the alcohol readily react with each other to cause alkoxylation, use of previously partly alkoxylated organoaluminum compound has the same effect as use of unalkoxylated organoaluminum compound and alcohol in the reaction system.

The reaction regulator and the ring-opening polymerization catalyst may be added separately or they may be used as a mixture.

Polymerization Conditions

The ring-opening polymerization can be performed without using solvent, but is preferably carried out in an inert organic solvent. As the solvent, mention may be made of, for example, aromatic hydrocarbons such as benzene, toluene and xylene; aliphatic hydrocarbons such as n-pentane, hexane and heptane; alicyclic hydrocarbons such as cyclohexane; halogenated hydrocarbons such as styrene dichloride, dichloroethane, dichloroethylene, tetrachloroethane, chlorobenzene, dichlorobenzene and trichlorobenzene.

In the present invention, ring-opening polymerization temperature is adjusted within a specific range in order to inhibit production of oligomers (especially cyclic oligomers) which are low molecular weight components. That is, the polymerization temperature is usually 0–100° C., preferably 20–80° C., more preferably 35–75° C., and especially preferably 40–70° C. If the polymerization temperature is too low, conversion does not increase. If the polymerization temperature is too high, the amount of oligomers produced increases and this is not preferred.

Polymerization pressure is usually 0–50 kg/cm$^2$, preferably 0–20 kg/cm$^2$.

Solvents for the ring-opening polymerization reaction are preferably aliphatic hydrocarbons such as n-pentane, hexane and heptane; alicyclic hydrocarbons such as cyclopentane, cyclohexane and decalin; or halides of them (such as chloroform and dichloroethane). Since the thermoplastic DCP ring-opening polymers of the present invention are soluble in these solvents, the polymerization can be performed without causing precipitation of the polymer produced during the reaction. Moreover, when these solvents are used, after the ring-opening polymerization, the solvent is not needed to be exchanged, and successively the hydrogenation reaction can be efficiently carried out.

The ring-opening polymerization can be carried out in accordance with conventional methods, and preferred is a method of carrying out the polymerization with consecutively adding the DCP monomer during reaction (hereinafter referred to as "separate and consecutive addition method"). This method comprises (1) charging a part of the monomer (preferably about 1–50% by weight, more preferably about 2–40% by weight, especially preferably about 2–30% by weight), the inert organic solvent, the organoaluminum compound and the reaction regulator in a reaction vessel, and (2) then separately and continuously adding dropwise the remainder of the monomer and the transition metal compound with adjusting the temperature in the reaction systrem to the above range. Usually, stirring of the reaction system is continued during the ring-opening polymerization reaction.

According to the production method of the present invention, content of the low molecular weight components (oligomers, especially cyclic oligomers such as heptamers) in the produced thermoplastic DCP ring-opening polymer can be reduced to 10% by weight or less, preferably 5% by weight or less, more preferably 2% by weight or less. In many cases, it is possible to sharply reduce the content of the low molecular weight components to 1% by weight or less. Especially, according to the separate and consecutive addition method, not only the content of the low molecular weight components can be reduced, but also a thermoplastic DCP resin containing substantially no gel and having preferable molecular weight distribution can be obtained.

(Ring-opening Polymer)

According to the production method of the present invention, it is possible to produce a ring-opening polymer containing substantially no gel. The gel content is difficult to directly measure, but since with the increase of the gel content, the polymer solution becomes more difficult to filter, the gel content can be judged according to the filtration speed of the polymer solution. When a cyclohexane solution of the thermoplastic DCP ring-opening polymer of the present invention having a concentration of 5% by weight in concentration is prepared and this solution is filtered by a polytetrafluoroethylene (PTFE) filter (47 mmφ) having a pore diameter of 0.5 μm under a nitrogen pressure of 0.2 kgf/cm$^2$, the solution can be filtered at a filtration speed of 40 g/min or more, preferably 70 g/min or more, more preferably 80 g/min or more, and as a result, it can be seen that the polymer contains substantially no gel.

With the smaller gel content in the thermoplastic DCP ring-opening polymer (with the higher filtration speed), removal of foreign substances is easier and the hydrogenation efficiency is higher, and this is preferred.

Upon ring-opening polymerization, the DCP monomer represented by the formula (1) becomes a DCP ring-opening polymer having the repeating units represented by the formula (7):

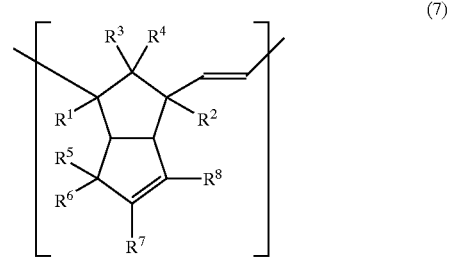

(7)

and the repeating units represented by the formula (8):

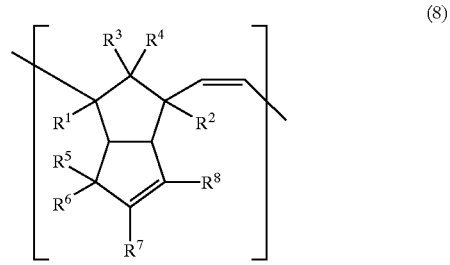

(8)

In these formulas, $R^1$–$R^8$ are the same as defined in the formula (1).

The recurring unit represented by the formula (7) is a recurring unit in which the polycyclic ring bonds in trans-position relative to the carbon-carbon double bond in the main chain (trans-bond unit) and the recurring unit represented by the formula (8) is a recurring unit in which the polycyclic ring bonds in cis-position relative to the carbon-carbon double bond in the main chain (cis-bond unit). As aforementioned, the thermoplastic DCP ring-opening polymer of the present invention contains 50 mol % or more of the cis-bond units.

Furthermore, upon ring-opening polymerization, the DCP monomer represented by the formula (2) becomes a DCP ring-opening polymer having the repeating units (trans-bond unit) represented by the formula (9):

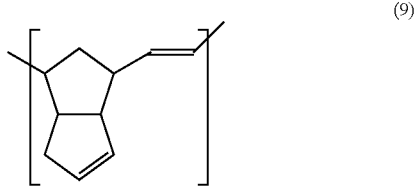

(9)

and the repeating units (cis-bond units) represented by-the formula (10):

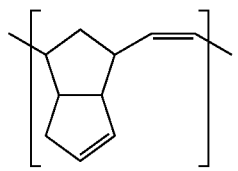

(10)

When other norbornene monomer is used in combination, there is produced a ring-opening polymer in which repeating units formed by the ring-opening polymerization of the respective norbornene monomers are introduced.

(Hydrogenation Product)

As can be seen from the formulas (7)–(10), the thermoplastic DCP ring-opening polymer has two carbon-carbon double bonds in 5-membered ring of the main chain and the side chain. The thermoplastic DCP ring-opening polymer is preferably one in which these carbon-carbon double bonds are saturated by hydrogenation from the viewpoints of heat resistance, weathering resistance, light resistance, solvent resistance, chemical resistance and water resistance.

Hydrogenation Reaction

The hydrogenation can be carried out by hydrogenation of the thermoplastic DCP ring-opening polymer with hydrogen in the presence of a hydrogenation catalyst in accordance with conventional method.

As the hydrogenation catalysts, there may be used those which are generally used for hydrogenation of olefin compounds and they are not limited, and examples thereof are as follows. As homogeneous system catalysts, mention may be made of catalyst systems comprising combination of a transition metal compound and an alkyl metal compound, such as cobalt acetate/triethylaluminum, nickel acetylacetonate/triisobutylaluminum, titanocene dichloride/n-butyllithium, zirconocene dichloride/sec-butyllithium, and tetrabutoxy titanate/dimethylmagnesium. As heterogeneous catalysts, mention may be made of solid catalysts such as nickel, palladium, platinum or these metals supported on carriers such as carbon, silica, diatomaceous earth, alumina and titanium oxide, such as nickel/silica, nickel/diatomaceous earth, nickel/alumina, palladium/carbon, palladium/silica, palladium/diatomaceous earth, and palladium/alumina.

The hydrogenation reaction is usually carried out in an inert organic solvent. As the organic solvents, hydrocarbon solvents are preferred because they are superior in dissolvability for hydrogenation products produced, and cyclic hydrocarbon solvents are more preferred. These hydrocarbon solvents include, for example, aromatic hydrocarbons such as benzene and toluene; aliphatic hydrocarbons such as n-pentane and hexane; alicyclic hydrocarbons such as cyclohexane and decalin; and ethers such as tetrahydrofuran and ethylene glycol dimethyl ether. From the point of hydrogenation efficiency, the organic solvents are preferably aliphatic hydrocarbons such as n-pentane, hexane and heptane; alicyclic hydrocarbons such as cyclopentane, cyclohexane and decalin; or halides thereof (e.g., chloroform, dichloroethane, etc.); and cyclic ethers such as tetrahydrofuran. These organic solvents can be used each alone or in combination of two or more. Usually, the organic solvents may be the same as polymerization reaction solvents, and the reaction can be carried out by adding the hydrogenation catalysts as they are, to the polymerization reaction mixture.

The hydrogenation reaction is usually carried out at −20–200° C., and under a hydrogen pressure of 0.1–50 kg/cm$^2$ though the ranges vary depending on the hydrogenation catalyst systems employed. Especially, the hydrogenation efficiency can be enhanced by carrying out the hydrogenation reaction under the conditions of relatively low temperature and low pressure, for example, in the temperature range of −20–150° C., preferably 0–130° C., and in the hydrogen pressure range of 0.1–30 kg/cm$^2$, preferably 1–20 kg/cm$^2$.

As mentioned above, from the points of heat resistance, weathering resistance, light resistance, solvent resistance, chemical resistance and water resistance, it is preferred to saturate usually 90% or more, preferably 95% or more, more preferably 98% or more, most preferably 99% or more of the carbon-carbon double bonds by hydrogenation.

When there is a substituent having non-conjugated unsaturated bond, such as alkylidene group, in the side chain, the unsaturated bond in the substituent is hydrogenated simultaneously with hydrogenation of the unsaturated bonds in the main chain and the 5-membered ring. When an aromatic ring is present in the side chain, the aromatic ring may remain unhydrogenated, but in the case of using the hydrogenated product for the use such as optical materials, the aromatic ring is preferably hydrogenated at the proportion as mentioned above for reducing birefringence.

After the hydrogenation reaction, if necessary, the hydrogenation catalyst is ashed by conventional method and then the solvent is removed by drying, whereby the hydrogenation product can be recovered. The drying method includes a method of coagulation and fractionation, followed by drying, a method of direct drying with direct removal of the solvent, and others.

By the hydrogenation, for example, the recurring unit represented by the formula (7) becomes a hydrogenation product represented by the formula (11):

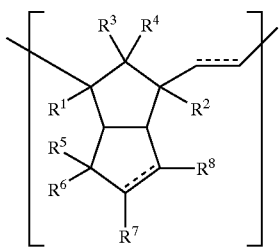

(11)

(wherein === denotes a single bond or a double bond of carbon-carbon and this shows that there may coexist the repeating units where the carbon-carbon double bond is hydrogenated and the repeating units where the carbon-carbon double bond is unhydrogenated, $R^1$–$R^8$ are the same as defined before, and when these have unsaturated bond, there is the case where the unsaturated bond is saturated by hydrogenation).

When the thermoplastic DCP ring-opening polymer having the repeating units represented by the above formula (9) is hydrogenated, a saturated polymer having the repeating units represented by the formula (12) is obtained in case the hydrogenation rate is high.

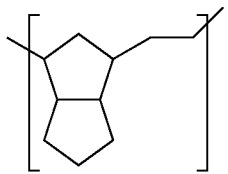

(12)

Similarly, when the repeating units represented by the formulas (8) and (10) are hydrogenated, they become repeating units in which the carbon-carbon unsaturated bonds in the formulas are partially or nearly completely hydrogenated.

(Molding Materials)

Depending on the use, various compounding ingredients such as. organic or inorganic fillers, stabilizers, antistatic agents and lubricants are added to the hydrogenation products of the thermoplastic DCP ring-opening polymers of the present invention or, if necessary, the hydrogenation products are blended with other polymer components to obtain molding materials. The resulting molding materials can be used as starting materials for obtaining various molded products.

<Wire Coating Materials>

For example, for the use of the hydrogenation products of the present invention as wire coating materials, crosslinking agents, foaming agents, flame retardants, and other polymers can be added thereto.

Crosslinking Agents

The crosslinking agents are not limited, and there may be used (1) organic peroxides, (2) crosslinking agents exhibiting effect by application of heat, (3) crosslinking agents exhibiting effect by application of light, and the like.

(1) Organic Peroxides

As the organic peroxides, mention may be made of, for example, ketone peroxides such as methyl ethyl ketone peroxide and cyclohexanone peroxide; peroxy ketals such as 1,1-bis(t-butylperoxy)3,3,5-trimethylcyclohexane and 2,2-bis(t-butylperoxy)butane; hydroperoxides such as t-butyl hydroperoxide and 2,5-dimethylhexane-2,5-dihydroperoxide; dialkyl peroxides such as dicumylperoxide, 2,5-dimethyl-2,5-di(t-butylperoxy)hexyne-3, and α,α'-bis(t-butylperoxy-m-isopropyl)benzene; diacyl peroxides such as octanoyl peroxide and isobutyryl peroxide; and peroxy esters such as peroxy dicarbonate.

Among them, crosslinking agents high in decomposition temperature and excellent in heat resistance are preferred from the points of moldability and performances of resins after crosslinking, and preferred are hydroperoxides, dialkyl peroxides and peroxy ketals, and especially preferred are dicumyl peroxide, 1,1-bis(t-butylperoxy)3,3,5-trimethylcyclohexane, 2,5-dimethyl-2,5-di(t-butylperoxy)hexyne-3, and 2,5-dimethylhexane-2,5-dihydroperoxide.

(2) Crosslinking Agents Exhibiting Effects Upon Application of Heat

Crosslinking agents exhibiting their effects upon application of heat have no special limitation as far as they can bring about crosslinking reaction by heating, and include, for example, aliphatic polyamines such as diamine, triamine and the higher amines, alicyclic polyamines, aromatic polyamine bisazides, acid anhydrides, dicarboxylic acids, polyhydric phenols, polyamides. As examples thereof, mention may be made of aliphatic polyamines such as hexamethylenediamine, triethylenetetramine, diethylenetriamine and tetraethylenepentamine; alicyclic polyamines such as diaminocyclohexane, 3(4), 8(9)-bis(aminomethyl)tricyclo[$5.2.1.0^{2,6}$]decane, 1,3-(diaminomethyl)cyclohexane, menthenediamine, isophoronediamine N-aminoethylpiperazine, bis(4-amino-3-methylcyclohexyl)methane and bis(4-aminocyclohexyl)methane; aromatic polyamines such as 4,4'-diaminodiphenyl ether, 4,4'-diaminodiphenyl-methane, α,α'-bis(4-aminophenyl)-1,3-diisopropylbenzene, α,α'-bis(4-aminophenyl)-1,4-diisopropylbenzene, 4,4'-diaminodiphenyl sulfone and methaphenylenediamine; bisazides such as 4,4'-bisazidobenzal(4-methyl)cyclohexanone, 4,4'-diazidocalcon, 2,6-bis (4'-azidobenzal)cyclohexanone, 2,6-bis(4'-azidobenzal)-4-methyl-cyclohexanone, 4,4'-diazidodiphenyl sulfone, 4,4'-diazidodiphenyl-methane and 2,2'-diazidestilbene; acid anhydrides such as phthalic anhydride, pyromellitic anhydride, benzophenonetetracarboxylic anhydride, nadic anhydride, 1,2-cyclohexanedicarboxylic anhydride, maeid anhydride-modified polypropylene and maleic anhydride-modified cyclic olefin resins; dicarboxylic acids such as fumaric acid, phthalic acid, maleic acid, trimellitic acid and Himic acid; polyhydric phenols such as phenolic novolak resins and cresol novolak resins; polyhydric alcohols such as tricyclodecanediol, diphenylsilanediol, ethylene glycol and derivatives thereof, diethylene glycol and derivatives thereof, and triethylene glycol and derivatives thereof; and polyamides such as nylon-6, nylon-66, nylon-610, nylon-11, nylon-612, nylon-12, nylon-46, methoxymethylated polyamide, polyhexamethylene-diamineterephtalamide and polyhexamethylene-isophthalamide.

These can be used each alone or in combination of two or more. Among them, aromatic polyamines, acid anhydrides, polyhydric phenols and polyhydric alcohols are preferred because the resulting cured products are excellent in heat resistance, mechanical strength, adhesion to metal, and dielectric characteristics (low dielectric constant, low dielectric loss tangent). Especially preferred are 4,4-diaminodiphenylmethane (aromatic polyamine), maleic anhydride-modified cyclic olefin resins (acid anhydride) and polyhydric phenols.

Furthermore, if necessary, efficiency of the crosslinking reaction can be enhanced by adding a curing accelerator.

Amount of the crosslinking agent added is not limited, and it is used in an amount of 0.1–30 parts by weight, preferably 1–20 parts by weight based on 100 parts by weight of the polymer for efficiently carrying out the crosslinking reaction and improving properties of the resulting cured products and from the economical viewpoint. If the amount of the crosslinking agent is too small, the crosslinking takes place with difficulty and sufficient heat resistance and solvent resistance cannot be obtained, and if it is too large, water absorption and dielectric characteristics of the crosslinked resin are deteriorated. Within the above range, these characteristics are highly balanced and the above range is preferred.

Examples of the curing accelerators are amines such as pyridine, benzyldimethylamine, triethanolamine, triethylamine and imidazoles, and they are added for control of curing speed or further improvement of crosslinking reaction. Amount of the curing accelerators is not limited, and is used in an amount of usually 0.1–30 parts by weight, preferably 1–20 parts by weight based on 100 parts by weight of the polymer. Within this range, crosslinking density, dielectric characteristics and water absorption rate are highly balanced and this is preferred. Among them, imidazoles are especially preferred because of their excellent dielectric characteristics.

(3) Crosslinking Agents Exhibiting Effects with Light

Crosslinking agents exhibiting effects with light are not limited as far as they are photo-reactive substances which react with the polymer upon irradiation with active rays, e.g., ultraviolet rays such as g-ray, h-ray and i-ray, far ultraviolet rays, x-rays, and electron rays. They include, for example, aromatic bisazide compounds, photo-amine producing agents and photo-acid producing agents.

Examples of the aromatic bisazide compounds are 4,4'-diazidocalcon, 2,6-bis(4'-azidobenzal)cyclohexanone, 2,6-bis(4'-azidobenzal)-4-methylcyclohexanone, 4,4'-diazidodiphenyl sulfone, 4,4'-diazidobenzophenone, 4,4'-diazidodiphenyl, 2,7-diazidofluorene, and 4,4'-diazidophenylmethane. These may be used each alone or in combination of two or more.

Examples of photo-amine producing agents are o-nitrobenzyloxycarbonylcarbamates, 2,6-dinitrobenzyloxycarbonylcarbamates or $\alpha,\alpha$-dimethyl-3,5-dimethoxybenzyloxycarbonylcarbamates of aromatic amines or aliphatic amines, and typical examples are o-nitrobenzyloxycarbonylcarbamates of aniline, cyclohexylamine, piperidine, hexamethylenediamine, triethylenetetramine, 1,3-(diaminomethyl)-cyclohexane, 4,4'-diaminodiphenyl ether, 4,4'-diaminodiphenylmethane, and phenylenediamine. These may be used each alone or in combination of two or more.

The photo-acid producing agents are substances which produce Bronsted acids or Lewis acids upon irradiation with active rays, and examples thereof are onium salts, halogenated organic compounds, quinonediazide compounds, $\alpha,\alpha$-bis(sulfonyl)-diazomethane compounds, $\alpha$-carbonyl-$\alpha$-sulfonyl-diazomethane compounds, sulfone compounds, organic acid ester compounds, organic acid amide compounds, and organic acid imide compounds.

These compounds which can cleave upon irradiation with active rays to produce acids may be used each alone or in combination of two or more.

Amount of these photo-reactive compounds is not limited, but they are used in an amount of 0.1–30 parts by weight, preferably 1–20 parts by weight based on 100 parts by weight of the polymer for efficiently performing the reaction with the polymer and for not damaging the properties of the resulting crosslinked resin and from the economical view point. If the amount of the photo-reactive substances is too small, the crosslinking occurs with difficulty and sufficient heat resistance and solvent resistance cannot be obtained, and if it is too large, characteristics of the crosslinked resin, such as water absorption and dielectric characteristics are deteriorated. Within the above range, these characteristics are highly balanced and this is preferred.

Foaming Agents

Foaming agents can be added in the case of using the polymers for wires which require low dielectric constant and low dielectric loss tangent, such as communication cables, coaxial cables for computers and high-frequency cables. The foaming agents are not limited as far as they are those which are conventionally added to synthetic rubbers, vinyl chloride resins, polyethylene, polypropylene, ABS resins, etc. and decompose upon heating of the compositions to generate carbon dioxide, nitrogen gas, ammonia or the like to form a cell structure in the polymers. Preferred are those which are conventionally used for foamed polyethylene.

As examples of the foaming agents, mention may be made of inorganic foaming agents such as sodium bicarbonate, ammonium bicarbonate and ammonium carbonate; nitroso compounds such as N,N'-dinitrosopentamethylenetetramine and N,N'-dimethyl-N,N'-dinitrosoterephthalamide; azo compounds such as azodicarbonamide, azobisisobutyronitrile, barium azodicarboxylate; sulfonylhydrazides such as benz-enesulfonylhydrazide, p,p'-oxybis (benzene-sulfonylhydrazide), a mixture of benzene-1,3-disulfonylhydrazide and paraffin chloride, and toluenesulfonylhydrazide and derivatives thereof; and other foaming agents such as p-toluenesulfonyl-semicarbazide, trihydrazinotriazine and zinc-amine complex compounds.

Especially, when dinitrosopentamethylene-tetramine (DPT) or the like is used, foaming aids can be added for acceleration of decomposition and reducing decomposition temperature, and organic acids such as salicylic acid, urea and the like are used.

Flame Retardants

Flame retardants are not essential, but are preferably added for wires such as high-voltage power cables through which a large quantity of current flows. The flame retardants are not limited, but preferably those which are not decomposed, not modified or not changed in properties with curing agents. Halogen-based flame retardants are generally used.

Various chlorine and bromine flame retardants can be used as the halogen-based flame retardants, and from the points of flame retarding effect, heat resistance at molding, dispersibility in resin and influence on properties of resin, preferred are as follows: hexabromobenzene, pentabromoethylbenzene, hexabromobiphenyl, decabromodiphenyl, hexabromodiphenyl oxide, octabromodiphenyl oxide, decabromodiphenyl oxide, pentabromocyclohexane, tetrabromobisphenol A and derivatives thereof [for example, tetrabromobisphenol A-bis (hydroxyethyl ether), tetrabromobisphenol A-bis(2,3-dibromopropyl ether), tetrabromobisphenol A-bis (bromoethyl ether), and tetrabromobisphenol A-bis(allyl ether)], tetrabromobisphenol S and derivatives thereof [for example, tetrabromobisphenol S-bis(hydroxyethyl ether) and tetrabromobisphenol S-bis(2,3-dibromopropyl ether)], tetrabromophthalic anhydride and derivatives thereof [for example, tetrabromo-phthalimide and ethylenebistetrabromophthalimide], ethylenebis(5,6-dibromonorbornene-2,3-dicarboxyimide), tris-(2,3-dibromopropyl-1)-isocyanurate, Diels-Alder reaction adducts of hexachlorocyclopentadiene, tribromophenylglycidyl ether, tribromophenyl acrylate, ethylenebistribromophenyl ether, ethylenebispentabromophenyl ether, tetradecabromodiphenoxybenzene, brominated polystyene, brominated polyphenylene oxide, brominated epoxy resin, brominated polycarbonate, polypentabromobenzyl acrylate, octabromonaphthalene, hexabromocyclododecane, bis(tribromophenyl)-fumaramide, and N-methylhexabromodiphenylamine.

Amount of the flame retardants is usually 3–150 parts by weight, preferably 10–140 parts by weight, especially preferably 15–120 parts by weight based on 100 parts by weight of the polymer.

As flame-retarding aids for further effective exhibition of the frame-retarding effect, there may be used, for example, antimony-based frame-retarding aids such as antimony trioxide, antimony pentoxide, sodium atimonate and antimony trichloride. These flame-retarding aids are used in an amount of usually 1–30 parts by weight, preferably 2–20 parts by weight based on 100 parts by weight of the flame retardant.

Other Polymers

Other polymers such as thermoplastic resins and soft polymers can be added to the hydrogenation products of the thermoplastic DCP ring-opening polymers in the present invention for the purpose of improving mechanical characteristics and molding processability.

As the other thermoplastic resins, mention may be made of, for example, polyolefins such as low-density polyethylene, high-density polyethylene, straight chain low-density polyethylene, ultra-low-density polyethylene, polypropylene, polybutene and polypentene; polyesters such as polyethylene terephthalate and polybutylene terephthalate; polyamides such as nylon-6 and nylon 6,6; ethylene-ethyl acrylate copolymer, ethylene-vinyl acetate copolymer, polystyrene, polyphenylene sulfide, polyphenylene ether, polyamide, polyester, and polycarbonate. These other thermoplastic resins may be used each alone or in combination of two or more, and-amount thereof can be optionally selected as far as attainment of the object is not hindered.

Especially, when the amorphous cyclic olefin polymer of the present invention is blended with a crystalline resin such as polyethylene, melt viscosity characteristics at extrusion molding are highly balanced and this is suitable.

The soft polymers are not limited, and may be those which have at least one Tg of 40° C. or lower. Examples of the soft polymers are random or block copolymers of aromatic vinyl monomers and conjugated diene monomers such as styrene-butadiene block copolymer, styrene-butadiene-styrene block copolymer, styrene-isoprene block copolymer, styrene-isoprene-styrene block copolymer and styrene-butadiene random copolymer, and hydrogenated products thereof; polyisoprene rubbers; polyolefin rubbers such as ethylene-propylene copolymer, ethylene-a-olefin copolymer and propylene-α-olefin copolymer, diene copolymers such as ethylene-propylene-diene copolymer, α-olefin-diene copolymer, diene copolymer, isobutylene-isoprene copolymer and isobutylene-diene copolymer; and norbornene rubber-like polymers such as copolymers of norbornene monomers and ethylene or α-olefin, terpolymers of norbornene monomers, ethylene and α-olefin and ring-opening polymers of norbornene monomers. These other soft polymers may be used each alone or in combination of two or more, and amount thereof can be optionally selected as far as attainment of the object is not hindered.

Especially, when the soft polymers are added, mechanical strength, elongation (flexibility) and flexing resistance of the coating materials are further improved.

Other Compounding Ingredients

Furthermore, various compounding ingredients generally used in the field of resin industry can be added to the wire coating materials of the present invention.

Stabilizers include, for example, phenolic antioxidants, phosphorus antioxidants and sulfur antioxidants. Among them, phenolic antioxidants are preferred, and alkyl-substituted phenolic antioxidants are especially preferred. Further preferred are those which have a vapor pressure of $10^{-6}$ Pa or lower at 20° C. for inhibiting volatilization at molding. These stabilizers are used each alone or in combination of two or more. Amount of the stabilizers is optionally selected depending on the purpose of use, but is usually 0.001–10 parts by weight based on 100 parts by weight of the cyclic olefin polymer.

Moreover, for the purpose of improving moldability, lubricants are used as required. The lubricants include, for example, partial esters of polyhydric alcohols, full esters of polyhydric alcohols (95% or more of alcoholic hydroxyl groups of polyhydric alcohols being esterified), higher saturated alcohols and partial ethers of polyhydric alcohols. Among them, full esters of polyhydric alcohols are preferred, especially full esters of polyhydric alcohols with OH group-containing higher saturated fatty acids are preferred, and higher saturated alcohols are especially preferred. Further preferred are those which have a vapor pressure of $10^{-6}$ Pa or lower at 20° C. for inhibiting volatilization at molding. Amount of the lubricants is optionally selected depending on the purpose of use, but is usually 10 parts by weight or less, preferably 5 parts by weight or less, more preferably 3 parts by weight or less based on 100 parts by weight of the cyclic olefin polymer. If amount of the lubricants is large, they bleed out at the surface of the molded products and, for example, adhere to the surface in the form of oil droplets or adhere to the surface of mold to deteriorate transferability. Therefore, the lubricants are preferably not used or used in an amount of less than about 1 part by weight.

Other ingredients include, for example, dyes, antistatic agents, ultraviolet absorbers, light stabilizers and wax. These may be used each alone or in combination of two or more.

Blends

Furthermore, the wire coating materials of the present invention can be improved in endurance, heat resistance, processability, etc. by blending at optional ratio with usually employed insulation coating materials (polyethylene, polypropylene, crosslinked products thereof, etc.).

Particularly, flow characteristics of polyethylene, polypropylene, etc. which are crystalline polymers are improved, and, thus, eccentricity of conductor can be prevented.

<Plate Lens>

When the hydrogenation products of the present invention are used for plate lenses, if necessary, there may be added other polymers, e.g., rubbers such as polybutadiene, polyisoprene, SBS, SIS and SEBS; resins such as polystyrene, poly(meth)acrylate, polycarbonate, polyester, polyether, polyamide, polyimide and polysulfone; and others. These other polymers can be used each alone or in combination of two or more. The proportion is optionally selected as far as they do not hinder the attainment of the object.

Compounding Ingredients

In the case of materials for plate lenses, compounding ingredients can also be added, if necessary. The ingredients have no particular limitation as far as they are light diffusing materials for the purpose of giving optical characteristics of plate lenses and other generally employed thermoplastic resin materials. Mention may be made of, for example, antioxidants, ultraviolet absorbers, near infrared absorbers, coloring materials such as dyes and pigments, lubricants, antistatic agents, fluorescent brighteners, and plasticizers.

Age inhibitors include phenolic antioxidants, phosphorus antioxidants, sulfur antioxidants, etc. Among them, phenolic antioxidants are preferred, and alkyl-substituted phenolic antioxidants are especially preferred.

As the phenolic antioxidants, there may be used known antioxidants. Examples thereof are acrylate compounds as disclosed in JP-A-63-179953 and JP-A-1-168643, such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)-ethyl)phenyl acrylate; alkyl-substituted phenolic compounds such as octadecyl-3-(3,5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3', 5'-di-t-butyl-4'-hydroxyphenylpropionate)methane [namely, pentaerythrimethyl-tetrakis(3-(3,5-di-t-butyl-4-hydroxyphenylpropionate))] and triethylene glycol bis(3-(3-t-butyl-4-hydroxy-5-methylphenyl)-propionate); and triazine group-containing phenolic compounds such as 6-(4-hydroxy-3,5-di-t-butylanilino)-2,4-bisoctylthio-1,3,5-triazine, 4-bisoctylthio-1,3,5-triazine and 2-octylthio-4,6-bis-(3,5-di-t-butyl-4-oxyanilino)-1,3,5-triazine.

The phosphorus antioxidants have no special limitation as far as they are those which are commonly used in general resin industries. Examples thereof are monophosphite compounds such as triphenyl phosphite, diphenylisodecyl phosphite, phenyldiisodecyl phosphite, tris(nonylphenyl) phosphite, tris(dinonylphenyl)phosphite, tris(2,4-di-t-butylphenyl)phosphite and 10-(3,5-di-t-butyl-4-hydroxybenzyl)-9,10-dihydro-9-oxa-10-phosphaphenanthrene-10-oxide; and diphosphite compounds such as 4,4'-butylidene-bis(3-methyl-6-t-butylphenyl-di-tridecyl phosphite) and 4,4'-isopropylidene-bis(phenyl-di-alkyl($C_{12}$–$C_{15}$) phosphite). Among them, monophosphite compounds are preferred, and tris(nonylphenyl)phosphite, tris(dinonylphenyl)phosphite and tris(2,4-di-t-butylphenyl)phosphite are especially preferred.

Examples of the sulfur antioxidants are dilauryl 3,3-thiodipropionate, dimyristyl 3,3,'-thiodipropionate, distearyl 3,3-thiodipropionate, laurylstearyl 3,3-thiodipropionate, pentaerythritol-tetrakis-(β-lauryl-thio-propionate) and 3,9-bis(2-dodecylthioethyl)-2,4,8,10-tetraoxaspiro[5,5]undecane.

These antioxidants can be used each alone or in combination of two or more. Amount of the antioxidants is optionally selected as far as the attainment of the object is not hindered, but is usually 0.001–5 parts by weight, preferably 0.01–1 part by weight based on 100 parts by weight of the polymer component.

Examples of the ultraviolet absorbers are hindered amine ultraviolet absorbers such as 2,2,6,6-tetramethyl-4-piperidyl benzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butyl malonate and 4-(3-(3,5-di-t-butyl-4-hydroxyphenyl)propionyloxy)-1-(2-(3-(3,5-di-t-butyl-4-hydroxyphenyl)propionyloxy)-ethyl-2,2,6,6-tetramethylpiperidine; benzotriazole ultraviolet absorbers such as 2-(2-hydroxy-5-methylphenyl)2H-benzotriazole, 2-(3-t-butyl-2-hydroxy-5-methylphenyl)-5-chloro-2H-benzotriazole, 2-(3,5-di-t-butyl-2-hydroxyphenyl)-5-chloro-2H-benzotriazole, 2-(3,5-di-t-butyl-2-hydroxyphenyl)-2H-benzotriazole, 5-chloro-2-(3,5-di-t-butyl-2-hydroxyphenyl)-2H-benzotriazole and 2-(3,5-di-t-amyl-2-hydroxyphenyl)-2H-benzotriazole; benzoate ultraviolet absorbers such as 4-t-butylphenyl-2-hydroxybenzoate, phenyl-2-hydroxybenzoate, 2,4-di-t-butylphenyl-3,5-di-t-butyl-4-hydroxybenzoate, hexadecyl-3,5-di-t-butyl-4-hydroxybenzoate, 2-(2H-benzotriazol-2-yl)-4-methyl-6-(3, 4,5,6-tetrahydrophthalimidylmethyl)phenol, 2-(2-hydroxy-5-t-octylphenyl)-2H-benzotriazole and 2-(2-hydroxy-4-octylphenyl)-2H-benzotriazole; benzophenone ultraviolet absorbers such as 2,4-dihydroxy-benzophenone, 2-hydroxy-4-methoxybenzophenone, 2-hydroxy-4-methoxybenzophenone-5-sulfonic acid trihydrate, 2-hydroxy-4-octyloxybenzophenone, 4-dodecaloxy-2-hydroxybenzophenone, 4-benzyloxy-2-hydroxybenzophenone, 2,2',4,4'-tetrahydroxybenzophenone and 2,2'-dihydroxy-4,4'-dimethoxybenzophenone; acrylate ultraviolet absorbers such as ethyl-2-cyano-3,3-diphenyl acrylate and 2'-ethylhexyl-2-cyano-3,3-diphenyl acrylate; and nickel complex ultraviolet absorbers such as [2,2'-thiobis(4-t-octylphenolate)]-2-ethylhexyl-aminenickel.

The near infrared absorbers include, for example, cyanin near infrared absorbers; pyrylium near infrared absorbers; squalilium near infrared absorbers; croconium near infrared absorbers; azulenium near infrared absorbers; phthalocyanine near infrared absorbers; dithiol metal complex near infrared absorbers; naphthoquinone near infrared absorbers; anthraquinone near infrared absorbers; indophenol near infrared absorbers; and azi near infrared absorbers. Furthermore, mention may be made of commercially available near infrared absorbers such as SIR-103, SIR-114, SIR-128, SIR-130, SIR-132, SIR-152, SIR-159 and SIR-162 (manufactured by Mitsui Toatsu Chemicals, Inc.), and Kayasorb IR-750, Kayasorb IRG-002, Kayasorb IRG-003, IR-820B, Kayasorb IRG-022, Kayasorb IRG-023, Kayasorb CY-2, Kayasorb CY-4, and Kayasorb CY-9 (manufactured by Nippon Kayaku Co., Ltd.).

The dyes are not limited as far as they are those which are uniformly dispersed and dissolved in thermoplastic polymers having alicyclic structure, but oil-soluble dyes (various C.I.Solvent dyes) are widely used because these are superior in compatibility with thermoplastic hydrocarbon polymers used in the present invention. Examples of the oil-soluble dyes are various C.I. Solvent dyes disclosed in Color Index Vol.3 published from The Society of Dyes and Colourists.

The pigments include, for example, diarylide pigments such as Pigment Red 38; azolake pigments such as Pigment Red 48:2, Pigment Red 53 and Pigment Red 57:1; condensed azo pigments such as Pigment Red 144, Pigment Red 166, Pigment Red 220, Pigment Red 221 and Pigment Red 248; benzimidazolone pigments such as Pigment Red 171, Pigment Red 175, Pigment Red 176, Pigment Red 185 and Pigment Red 208; quinacridone pigments such as Pigment Red 122; perillene pigments such as Pigment Red 149, Pigment Red 178 and Pigment Red 179; and anthraquinone pigments such as Pigment Red 177.

When the plate lenses should be colored, either dyes or pigments can be used within the object of the present invention and are not limited, but in the case of plate lenses requiring micro optical properties, coloration with dyes is preferred. Moreover, ultraviolet absorbers sometimes show a color of yellow-red according to visual observation and near infrared absorbers sometimes show black color according to visual observation. Therefore, these absorbers and dyes are not needed to be used in severe distinction from each other, and these may be used in combination.

The antistatic agents include, for example, long chain alkyl alcohols such as stearyl alcohol and behenyl alcohol, and fatty acid esters with polyhydric alcohols, such as glycerin monostearate and pentaerythritol monostearate. Stearyl alcohol and behenyl alcohol are especially preferred.

These compounding ingredients may be used each alone or in combination of two or more, and the proportion is optionally selected in the ranges in which the object of the present invention is not damaged. Amount of them is optionally selected as far as the object of the present invention is not damaged, and is usually 0.001–5 parts by weight, preferably 0.01–1 part by weight based on 100 parts by weight of the polymer component. These can be kneaded by a twin-screw extruder in use. Normally, these can be used as pellets.

<Agricultural Films>

When the hydrogenation products of the present invention are used for agricultural films, if necessary, other polymers can be added. The other polymers include, for example, rubber-like polymers and other thermoplastic resins.

As the rubber-like polymers, mention may be made of, for example, diene rubbers such as natural rubber, polybutadiene rubber, polyisoprene rubber and acrylonitrile-butadiene copolymer rubber; styrene-butadiene copolymer rubber, styrene-isoprene copolymer rubber, styrene-butadiene-isoprene terpolymer rubber; hydrogenation products of diene rubbers; ethylene-a-olefin copolymers such as ethylene-propylene copolymer and saturated polyolefin rubbers such as copolymers of propylene and other α-olefins; α-olefin-diene polymer rubbers such as ethylene-propylene-diene copolymer, α-olefin-diene copolymer, isobutylene-isoprene copolymer and isobutylene-diene copolymer; special rubbers such as urethane rubber, silicone rubber, polyether rubber, acrylic rubber, propylene oxide rubber and ethylene acrylate rubber; thermoplastic elastomers such as styrene-butadiene-styrene block copolymer rubber and styrene-isoprene-styrene block copolymer rubber; hydrogenated thermoplastic elastomers; urethane thermoplastic elatomers; polyamide thermoplastic elastomers; and 1,2-polybutadiene thermoplastic elastomers.

As the other thermplastic resins, mention may be made of, for example, polyolefins such as low-density polyethylene, high-density polyethylene, straight chain low-density polyethylene, ultra-low-density polyethylene, polypropylene, syndiotactic polypropylene, polybutene and polypentene; polyesters such as polyethylene terephthalate and polybutylene terephthalate; polyamides such as nylon 6 and nylon 66; ethylene-ethyl acrylate copolymer, ethylene-vinyl acetate copolymer, polystyrene, syndiotactic polystyrene, polyphenylene sulfide, polyphenylene ether, polyamide, polyester, and polycarbonate.

These other polymers can be used each alone or in combination of two or more. Amount of the other polymers is usually 100 parts by weight or less, preferably 70 parts by weight or less, more preferably 50 parts by weight or less, most preferably 30 parts by weight or less based on 100 parts by weight of the thermoplastic dicyclopentadiene ring-opening polymer (I).

Compounding Ingredients

Furthermore, if necessary, compounding ingredients can be added to the hydrogenation products of the present invention. The ingredients are not limited as far as they are generally employed in resin industries. Examples thereof are above-mentioned antioxidants and ultraviolet absorbers (light stabilizers), and, in addition, lubricants, anti-fogging agents, anti-clouding agents, plasticizers and antistatic agents.

As the lubricants, there may be generally used inorganic fine particles. The inorganic fine particles include, for example, particles of oxides, hydroxides, sulfides, nitrides, halides, carbonates, sulfates, acetates, phosphates, phosphites, organic carboxylates, silicates, titanates and borates of elements of Groups 1, 2, 4, 6, 7, 8–10, 11, 12, 13, and 14 of the periodic table, and hydrous compounds of them, composite compounds mainly composed of them, and natural minerals.

Examples of the inorganic fine particles are fine particles of compounds of elements of Group 1, such as lithium fluoride and borax (hydrous sodium borate); compounds of elements of Group 2, such as magnesium carbonate, magnesium phosphate, magnesium oxide (magnesia), magnesium chloride, magnesium acetate, magnesium fluoride, magnesium titanate, magnesium silicate, hydrous magnesium silicate (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium titanate, zinc titanate, lanthanum titanate, bismuth titanate, lead titanate, barium carbonate, barium phosphate, barium sulfate and barium phosphite; compounds of elements of Group 4, such as titanium dioxide (titania), titaniummonoxide, titaniumnitride, zirconium dioxide (zirconia) and zirconium monoxide; compounds of elements of Group 6, such as molybdenum dioxide, molybdenum trioxide and molybdenum sulfide; compounds of elements of Group 7, such as manganese chloride and manganese acetate; compounds of elements of Groups 8–10, such as cobalt chloride and cobalt acetate; compounds of elements of Group 11, such as cuprous iodide; compounds of elements of Group 12, such as zinc oxide and zinc acetate; compounds of elements of Group 13, such as aluminum oxide (alumina), aluminum hydroxide, aluminum fluoride and alumino silicate (alumina silicate, kaolin, kaolinite); compounds of elements of Group 14, such as silicon oxide (silica, silica gel), plumbago, carbon, graphite and glass; and natural minerals such as carnallite, kainite, mica, phlogopite and byroce ore. Average particle size of the inorganic fine particles used here is not limited, but is preferably 0.01–3 μm.

As the anti-fogging agents, there may be used those generally used for vinyl chloride resin films, such as sorbitan fatty acid esters, sorbitol fatty acid esters, glycerin fatty acid esters, diglycerin fatty acid esters and these compounds to which alkylene oxides such as ethylene oxide, propylene oxide and butylene oxide are added. Examples of the anti-fogging agents are sorbitan palmitate, sorbitan stearate, sorbitan behenate, sorbitan stearate-ethylene oxide (2 mols) adduct, sorbitan stearate-propylene oxide (3 mols) adduct, sorbitol stearate, sorbitol stearate-ethylene oxide (3 mols) adduct, diglycerinpalmitate, diglycerin stearate, glycerin palmitate-ethylene oxide (2 mols) adduct, sorbitan stearate adipate-ethylene oxide (3 mols) adduct, sorbitol stearate adipate-ethylene oxide (2 mols) adduct, diglycerin palmitate sebacate-propylene oxide (3 mols) adduct and sorbitol palmitate adipate-ethylene oxide (3 mols) adduct.

As the anti-clouding agents, there may be used fluorine-containing compounds generally used for agricultural vinyl chloride resins. Examples thereof are fluorine-containing alkylene oxide compounds disclosed in JP-A-5-163406 and JP-A-5-331339, and colloidal hydrophobic silica disclosed in JP-A-6-1162.

As the plasticizers, there may be used, for example, phosphoric acid triester plasticizers such as tricresyl phosphate, trixylyl phosphate, triphenyl phosphate, triethylphenyl phosphate, diphenylcresyl phosphate, monophenyldicresyl phosphate, dicresylmonoxylenyl phosphate, arylalkyl phosphates, diphenylmonoxylenyl phosphate, monophenyldixylenyl phosphate, tributyl phosphate, triethyl phosphate, trichloroethyl phosphate, trioctyl phosphate and tris(isopropylphenyl)phosphate; phthalic acid ester plasticizers such as dimethyl phthalate, diethyl phthalate, dibutyl phthalate, diheptyl phthalate, di-n-octyl phthalate, di-2-ethylhexyl phthalate, diisononyl phthalate, octyldecyl phthalate and butylbenzyl phthlate; fatty monobasic acid ester plasticizers such as butyl oleate and glycerin monooleic acid ester; fatty dibasic acid ester plasticizers such as dibutyl adipate and di-n-octyl adipate; dihydric alcohol ester plasticizers; and hydroxy acid ester plasticizers. Among them, phosphoric acid triester plasticizers are preferred and tricresyl phosphate and trixylyl phosphate are especially preferred.

Furthermore, as softeners or plasticizers, hydrocarbon polymers which are liquid at room temperature and have a main backbone mainly composed of C—C or C=C structure are preferably used. Of the liquid hydrocarbon polymers, preferred are straight chain or branched chain liquid hydrocarbon polymers having no hydrocarbon ring in the main chain. Moreover, those which have no C=C structure are preferred from the point of weathering resistance of the resulting composition. Molecular weight of the liquid hydrocarbon polymers is preferably 10,000 or less, more preferably 200–8,000, especially preferably 300–4,000.

Examples of the liquid hydrocarbon polymers are squalane ($C_{30}H_{62}$, Mw=422.8), liquid paraffin (white oil, ISO VG10, ISO VG15, ISO VG32, ISO VG68, ISO VG100, VG8 and VG12 specified in JIS K2231), polyisobutene, hydrogenated polybutadiene, and hydrogenated polyisoprene. Among them, preferred are squalane, liquid paraffin and polyisobutene.

The antistatic agents include, for example, alkylsulfonates such as sodium alkylsulfonates and phosphonium alkylsulfonates; and glycerin ester of stearic acid.

These compounding ingredients can be used each alone or in combination of two or more. Amounts of these compounding ingredients can be optionally selected as far as the object of the present invention is not damaged.

<Composite Films, Food Packaging Films, Durable Plate Members>

Furthermore, when the hydrogenation products of the present invention are used for composite films, food packaging films or durable plate members, if necessary, there may also be optionally added compounding ingredients such as above-mentioned antioxidants, ultraviolet absorbers, lubricants, anti-fogging agents, anti-clouding agents, plasticizers, pigments, near infrared absorbers, and antistatic agents.

(Molding Method)

The above molding materials can be molded to various molded products. The molding can be carried out according to known molding methods such as injection molding, extrusion blow molding, injection blow molding, multilayer blow molding, connection blow molding, double-wall blow molding, stretch blow molding, vacuum molding and rotational molding. Melting temperature of the resin at molding is usually 150–350° C. Moreover, as disclosed in JP-A-4-276253, gas barrier properties, weathering resistance, light resistance, etc. can be enhanced by carrying out the multi-layer molding or double-wall molding with other resins. The compounding ingredients can be melt mixed the cyclic olefin resin by various kneading machines such as single-screw extruder, twin-screw extruder, roll and Banbury mixer after isolation of the cyclic olefin resin, but suitably are added to the cyclic olefin resin solution before filtration. Furthermore, the compounding ingredients may be dissolved in respectively suitable solvents and then added, and, if necessary, the solutions may be heated and then added. The cyclic olefin resin solution may also be heated beforehand. In many cases, the cyclic olefin resin is processed to a size of a grain of rice which is called pellet for the purpose of easy handling at molding. As mentioned above, necessary additives are added to the cyclic olefin resins to obtain molding materials for various uses.

(Molded Products)

Various molded products can be made from the above molding materials, and, especially, transparent molded products can be obtained (by selecting the compounding ingredients), and, besides, since they are excellent in mechanical strength such as impact resistance, low in permeation of water or water vapor and excellent in solvent resistance, they are suitable as molded products for optical uses such as lens, prism and polarizing film; molded products for medical uses such as press-through package, disposable syringe, liquid medicine vials and infusion bag; molded products for electric or electronic materials such as wire coating and wafer shipper; building materials such as carport and grazing; packaging films such as wrapping film, stretch film, shrink film and blister pack; and stationery products such as ball point pens.

<Films and Sheets>

The above molding materials can also be molded into transparent molded products such as thin films or sheets, which are excellent in mechanical strength such as impact resistance, low in permeation of water or water vapor, and excellent in solvent resistance. The resulting films or sheets are suitable as press-through package excellent in moisture proofness by stretching as required, and, further, as films for wrapping individual doses of medicines because they can be heat-sealed. These films or sheets are suitable as wrapping films or stretch films because they have self-adhesiveness; suitable as polarizing films and phase-different films because they are superior in transparency and low birefringence; suitable as light transmitting plates of superhighways, panels of automatic vending machines and carports because they are excellent in strength; and suitable as reflective films and marking films because they are excellent in weathering resistance.

Molding of films or sheets from the above molding materials can be performed by conventional methods, and, for example, melt molding method and solvent casting method can be employed. The melt molding method is preferred.

When films are produced by melt molding methods, there are employed melt extrusion methods such as a method using T-die and inflation method, calendering method, hot-pressing method, injection molding method, etc. The melt extrusion method using T-die is preferred since non-uniformity in thickness can be diminished. Conditions of the melt molding method are optionally selected depending on the molding methods. For example, in the case of the melt molding method using T-die, resin temperature is optionally selected within the range of glass transition temperature or higher and decomposition temperature or lower, and is usually 100–400° C., preferably 150–350° C., more preferably 200–300° C., and temperature of take-off rolls is usually 0–200° C., preferably 30–180° C., more preferably 50–150° C.

When films are produced using solvent casting method, this can be performed by conventional methods. For example, the components are dissolved or dispersed in solvents, the resulting liquid composition is cast on a suitable carrier (support), and then the solvent is dried and removed. The carriers used are not limited and those which are used in general solvent casting methods can be used. Examples of the carriers are flat plates, belts and roll such as glass plate, metal drum, steel belt, polyester film, PVC film, fluorocarbon resin belt, and metallic foil.

As the solvents, there may be used, for example, aromatic hydrocarbons such as benzene, toluene and xylene; alicyclic hydrocarbons such as cyclohexane; esters such as butyl acetate; ethers such as tetrahydrofuran and dimethoxyethane; alcohols such as methanol, ethanol and isopropanol; ketones such as methyl ethyl ketone; and halogenated solvents such as methylene chloride, chloroform, carbon tetrachloride and-ethylene dichloride. These solvents can be used each alone or in combination of two or more. Concentration of the cyclic olefin polymer in the solvent is optionally selected depending on the thickness of the film to be produced, and is usually 0.1–60% by weight, preferably 1–50% by weight, more preferably 5–45% by weight. When the concentration of the cyclic olefin polymer is within this range, control of the thickness of the film is easy and film-formability is excellent.

Method for casting the liquid composition on the carrier is not limited, and can be carried out using, for example, bar coater, T-die, T-die with bar, doctor knife, Meyer bar, roll coat, and die coat. Casting of the liquid composition may also be carried out by coating with spray, brush, roll, spin coat, dipping, etc. If the desired thickness cannot be obtained by one coating, the coating can be repeated.

The method for drying and removing the solvent is not limited and can be carried out by conventional methods, but drying is usually carried out in two or more stages in order to reduce the residual solvent concentration to 5% by weight or less, preferably 2% by weight or less, more preferably 1% by weight or less, most preferably 0.5% by weight or less. First, in the first stage, the film on a flat plate or roll is dried at a temperature of room temperature to 100° C., preferably room temperature to 80° C. until the residual solvent concentration is reduced to 10% by weight or less, preferably 5% by weight or less. In this case, if the drying temperature is too high, the film is foamed at volatilization of the solvent. Then, the film is peeled off from the flat plate or roll, and is heated to a temperature of room temperature to 60° C. or higher, preferably 70° C. to glass transition temperature (Tg) of the resin as the second stage drying to reduce the residual solvent concentration to 2% by weight or less, preferably 1% by weight or less, more preferably 0.5% by weight or less.

If the drying temperature is too high, drying does not proceed, and if it is too high, the film is apt to be foamed. After completion of the first stage drying, the film may be peeled off from the flat plate or roll, and the second stage drying may be carried out. If necessary, the drying of the solvent may be carried out under reduced pressure.

The film of the hydrogenation product (hereinafter sometimes referred to as "film (A)") used in the present invention can be monoaxially or biaxially stretched and then used.

Thickness of the film (A) used in the present invention is optionally selected according to the object of use, and is usually 1–500 μm, preferably 10–300 μm, more preferably 20–200 μm because such film has highly balanced mechanical strength, chemical resistance, gas barrier property and water vapor barrier property.

For using the film of the hydrogenation product in the present invention as a composite film, an additional film made by molding a polyvinyl alcohol polymer (hereinafter sometimes referred to as "film (B)") is needed.

The polyvinyl alcohol polymer is a polymer having a bond unit of vinyl alcohol, and generally used is a polymer having usually 10% by weight or more, preferably 20% by weight or more, more preferably 30% by weight or more of the bond unit of vinyl alcohol. Examples thereof are polyvinyl alcohol, and hydrolyzates or alcoholysis products of copolymers of vinyl acetate and a monomer copolymerizable therewith. The monomer copolymerizable with vinyl acetate has no special limitation, and ethylene is generally used. The proportion of the respective components in the copolymer of vinyl acetate and the monomer copolymerizable therewith can be optionally selected according to the object of use, and the selection can be conducted so that [vinyl alcohol unit]/copolymerized monomer unit] in the hydrolyzate or alcoholysis product of the copolymer is usually 1/9–9/1, preferably 2/8–8/2, more preferably 3/7–7/3 in weight ratio.

The polyvinyl alcohol polymer may be produced by conventional methods. The polyvinyl alcohol is produced by hydrolysis or alcoholysis of a vinyl acetate homopolymer or copolymer having a polymerization degree of 200–2,500, preferably 1,000–2,000 as known in JP-B-60-14695. A suitable polyvinyl alcohol is a vinyl acetate polymer in which about 50 to substantially 100%, most preferably 80–99.5% of acetate groups undergo hydrolysis or alcoholysis. Polyvinyl alcohol is disclosed in U.S. Pat. No. 3,541,069. Poly(ethylene-co-vinyl alcohol) is produced by hydrolysis or alcoholysis of an ethylene-vinyl acetate copolymer containing 5–70 mol %, preferably 10–60 mol %, morepreferably20–50 mol % of ethylene. Representative poly(ethylene-co-vinyl alcohol) are disclosed in U.S. Pat. Nos. 3,487,059 and 3,519,701.

The polyvinyl alcohol polymers used for the composite films of the present invention can contain other polymers and compounding ingredients as in the case of the film (A). Amounts of the other polymers and compounding ingredients can be optionally selected as far as the object of the present invention is not damaged.

Thickness of the film (B) used in the present invention is optionally selected according to the object of use, and is usually 1–500 μm. preferably 5–300 μm, more preferably 10–200 μm because such film has highly balanced mechanical strength, chemical resistance, gas barrier property and water vapor barrier property.

The composite film of the present invention comprises film (A) and film (B), and the composite film having additionally an adhesive layer (C) between the film (A) and the film (B) is suitable because this film has highly balanced mechanical strength, chemical resistance, gas barrier property and water vapor barrier property.

The adhesives of the adhesive layer (C) are not limited as far as they can bond the film (A) and the film (B), and include, for example, vinyl acetate copolymer emulsion adhesives, synthetic rubber (chloroprene, SBR, butyl rubber, etc.) adhesives, modified polyolefin adhesives modified with functional groups such as chlorine and maleic anhydride, and acrylic adhesives. Among them, the modified polyolefin adhesives are preferred. These adhesives can be used each alone or in combination of two or more.

The adhesive layer (C) used in the present invention can contain other compounding ingredients as far as the object of the invention is not damaged. The other compounding ingredients include those added to the composite film and, besides, tackifier and the like.

Thickness of the adhesive layer (C) used in the present invention is optionally selected according to the object of use, and is usually 0.1–200 μm, preferably 1–100 μm, more preferably 5–50 μm because, in this case, mechanical strength, chemical resistance, gas barrier property and water vapor barrier property are highly balanced.

The composite film of the present invention can be produced by conventional methods. Representative examples are the following two methods.

The first method for producing the composite film of the present invention comprises laminating the film (B) on at least one side of the film (A), if necessary, with the adhesive layer (C) therebetween, and contact bonding them with heating to obtain the composite film. The method for contact bonding with heating is optionally selected depending on the materials, and generally they are bonded by heating at usually 50–200° C., preferably 80–150° C., keeping at that temperature for usually 0.5–30 minutes, preferably 1–10 minutes, and then pressing under a pressure of 1–50 kg/cm$^2$, preferably 2–10 kg/cm$^2$.

According to the second method for producing the composite film of the present invention, a cyclic olefin polymer containing repeating units having the above-mentioned alicyclic structure, at least 30% by weight of which have no norbornane structure, and a polyvinyl alcohol polymer and, if necessary, an adhesive are co-extrusion molded whereby the composite film can be produced at a time.

The co-extrusion is a method which comprises simultaneously extruding the components (A) and (B), or (A), (B) and (C) from a composite die or adjacent dies under the conditions suitable for extrusion of the respective components (melting temperature, shape of screw, etc.), and putting these films or layers together in the state of sufficiently high temperature, and in this case, the extrusion conditions, the shape of die, etc. are optionally selected depending on the desired composite films.

Thickness of the composite film of the present invention is optionally selected according to the object of use, and is usually 1–500 μm, preferably 10–300 μm, more preferably 20–200 μm, most preferably 50–150 μm because, in this case, mechanical strength, chemical resistance, gas barrier property and water vapor barrier property are highly balanced.

The lamination form of the composite film of the present invention is not limited, and includes, for example, A-B, A-B-A, B-A-B, A-B-A-B, B-A-B-A, A-B-A-B-A, and B-A-B-A-B. Among them, those of at least one side being film (A) are preferred for the use under high humidity conditions. Specifically, these are A-B, A-B-A, A-B-A-B, and A-B-A-B-A, and preferred are A-B-A and A-B-A-B-A. Furthermore, if necessary, other thermoplastic resin layers; metallic film layers such as vapor-deposited aluminum layer, and oxide films or nitride films such as $TiO_2$, $SiO_2$, TiN or SiN may additionally be laminated.

Since the composite films of the present invention are excellent in mechanical strength, chemical resistance, gas barrier property and water vapor barrier property, they are used as packaging materials for foods, medicines, tobaccos, electronic parts, daily necessaries, notions, etc.; films required to have low moisture permeability and high optical characteristics for liquid crystal displays, such as polarizing films, phase difference films, liquid crystal substrates, light diffusion films and prism films; optical sheets, e.g., transparent sheets to be substituted for glass plates, which are required to have strength, such as window materials and roof materials of cars, window materials for aircraft, window materials for vending machines, show window materials and show case materials; materials for resist solution bags, medical fluid bags and infusion bags; electrical films such as electric insulation films and film capacitors; and films for building such as facing materials and roof materials.

<Wire Coating Material>

The wire coating material of the present invention can be coated on a conductor by co-extruding the conductor and the material once molten in a molding machine by extrusion molding method when the material is provided in the form of pellets as mentioned hereabove, but when the material is dissolved in an organic solvent and provided as a varnish, the varnish can be directly coated on the conductor. These methods can be optionally selected according to the thickness of the coating material and other prescribed properties.

In the case of using as a varnish, the solvent used includes, for example, aromatic hydrocarbons such as toluene, xylene and ethylbenzene, aliphatic hydrocarbons such as n-heptane, hexane and heptane, alicyclic hydrocarbons such as cyclohexane, and halogenated hydrocarbons such as chlorobenzene, dichlorobenzene and trichlorobenzene.

The solvent is used in an amount enough to uniformly dissolve or disperse the cyclic polymer and the components added optionally, and adjustment is conducted so that the solid concentration is in the range of usually 1–80% by weight, preferably 5–60% by weight, more preferably 10–50% by weight.

The coating material preferably has a melt viscosity of 50 poises or lower, preferably 20 poises or lower at 100–200° C. from the points of merits in handling and process.

Method for Extrusion Molding of Wire Coating Materials

The coating of the outer peripheral surface of a conductor with the wire coating material of the present invention supplied in the form of pellets can be performed by the known extrusion coating method using the same extruder as in wire coating with polyethylene. However, since the cyclic olefin polymer composition of the present invention is higher in glass transition temperature than that of conventional coating materials such as polyethylene, the melting temperature at extruding (cylinder temperature of the extruder) must be set at a higher temperature than in the conventional method.

Crosslinking

In the wire coating material of the present invention, the cyclic olefin polymer can be crosslinked for the purpose of improving heat resistance and mechanical characteristics. For carrying out the crosslinking, there may be employed a method of adding an organic peroxide as a crosslinking agent and carrying out crosslinking by heat treatment, a method of crosslinking by electron rays, ultraviolet rays or the like, a method of crosslinking with silane, and others like the conventionally known crosslinking method employed for crosslinked polyethylene (XLPE) cable (CV cable). Considering endurance, etc., crosslinking with organic peroxides, electron rays and ultraviolet rays is preferred.

The crosslinking reaction is carried out by heat treatment simultaneously with the extrusion molding. Preferably, the heat treatment is carried out with nitrogen gas or the like to inhibit deterioration of the resin.

Furthermore, since the cyclic olefin polymer of the present invention is high in glass transition temperature and melt extrusion temperature, when crosslinking is carried out using organic peroxides, it is preferred to use organic peroxides of high decomposition temperature mentioned in the above item "crosslinking agent" for easy control of crosslinking reaction rate.

Foaming

As methods for foaming the wire coating material in the present invention, there may be employed the aforementioned foaming method using known foaming agents and, besides, a method of allowing an inert gas to be present in the form of closed cells by directly injecting the gas into the molten polymer composition at extrusion molding.

Electric Wires

Electric wires obtained by coating a conductor with the wire coating material of the present invention can be used as various electric wires. Examples are plastic insulated wires such as distribution wires, control and instrumentation cables, wires for electronic apparatuses and mobile cables; electrical power cables such as insulated cables, high-voltage power cables and plastic power cables; and communication cables such as local and toll cables, central cables, wide area cables, high-frequency coaxial cables, high-frequency coaxial (tube) feeders and oval waveguides and communication wire and cables. The wire coating materials of the present invention are especially effective for high-voltage power cables and high-frequency coaxial cables in view of their excellent dielectric characteristics, water tree resistance, mechanical characteristics, flexing resistance and flexibility.

<Plate Lens>

The resin plate lenses of the present invention can be obtained by molding the above components. The molding is carried out by conventional methods such as injection molding method, compression molding method, extrusion method, casting method and continuous extrusion method. Preferred is a method of compression molding sheets or films made by melt extrusion method from the above components because fluctuation of optical characteristics of the surface can be diminished and characteristics such as processability and mechanical strength are superior.

The compression molding method comprises pressing the films or sheets with heating in a mold having a surface configuration conforming to the surface structure of a thermoplastic hydrocarbon resin plate lens to be made, and cooling the mold and taking out the molded product after lapse of a given period. The heating temperature and the compressing pressure and time can be optionally selected according to the shape of the plate lens made of thermoplastic hydrocarbon resin and characteristics of the thermoplastic hydrocarbon resin. For example, the temperature is usually Tg–(Tg+150)° C., preferably (Tg+20)–(Tg+100)° C. on the basis of the glass transition temperature (Tg) of the thermoplastic hydrocarbon resin. The pressure is usually 5–1000 Kgf/cm$^2$, preferably 10–500 kgf/cm$^2$. The heating time is preferably from several seconds to several ten minutes. When the plate lens comprising the thermoplastic hydrocarbon resin shaped with heating to Tg or higher is cooled and taken out, the shaped lens is taken out after the temperature of the lens lowers to (Tg–20)° C. or lower. Preferably, the temperature at cooling is lowered slowly at less than 5° C./min around Tg.

Preferred examples of the plate lens of the present invention are Fresnel lens and lenticular lens.

Thermoplastic Hydrocarbon Resin Fresnel Lens

Figure 2:
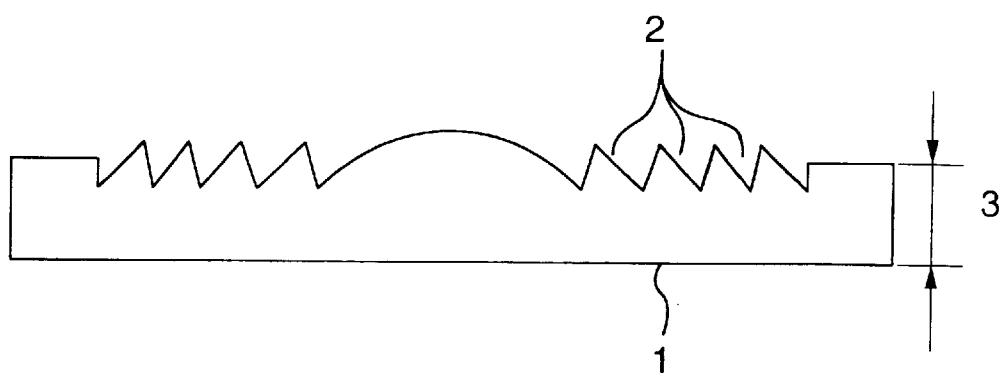
FIG. 2 is a sectional view of a Fresnel lens containing the hydrogenation product of the present invention.

FIGS. 1 and 2 show a general shape of thermoplastic hydrocarbon resin Fresnel lens. The thermoplastic hydrocarbon resin Fresnel lens 1 is a lens having a feature that lens faces 2 of concave lens and convex lens are disposed in plane and thickness 3 of the whole lens can be made thin. The numeral 2 indicates lens face part and the numeral 3 indicates thickness. Uses thereof are the same as of usual concave lens and convex lens, and it has functions to condense the light, disperse the light or make parallel the light. The thickness (3 in the figure) has no special limitation, but is preferably 0.01–10 mm from the points of rigidity and easiness in handling. Light transmittance (ASTM D103) is 80% or higher, preferably 90% or higher, more preferably 92% or higher over the total visible light range.

The shape of the thermoplastic hydrocarbon resin Fresnel lens has no limitation, but shape of the whole lens may be rectangular plate, circular plate or oval plate as shown in FIG. 1. Diameter of the lens face (outermost periphery) can be about 1–1,000 mm. The number of division of the curved surface (the number of division of the lens face; for example, in FIG. 1, the lens face is divided into five concentric rings and this is called five divisions) is two or more, and has no special upper limit. Curvature is 1 mm or more, and shape of the curved surface (2 in the figure) can be, for example, non-spherical surface such as sine curve, elliptic curve or parabola in addition to the curved face.

The thermoplastic hydrocarbon resin Fresnel lens of the present invention has characteristics such as mechanical strength, impact strength, low water absorption and light weight. Therefore, it hardly deforms due to the influence of environmental temperature and humidity, and shows little strain when used for large-sized optical instrument or information devices. Thus, errors in reading and writing of information can be diminished. Furthermore, the thermoplastic hydrocarbon resin Fresnel lens of the present invention can have thin-walled and precision surface structure and, hence, is also suitable as high precision optical elements such as pickup lenses for reading information by information devices.

Thermoplastic Hydrocarbon Resin Lenticular Lens

Figure 3:
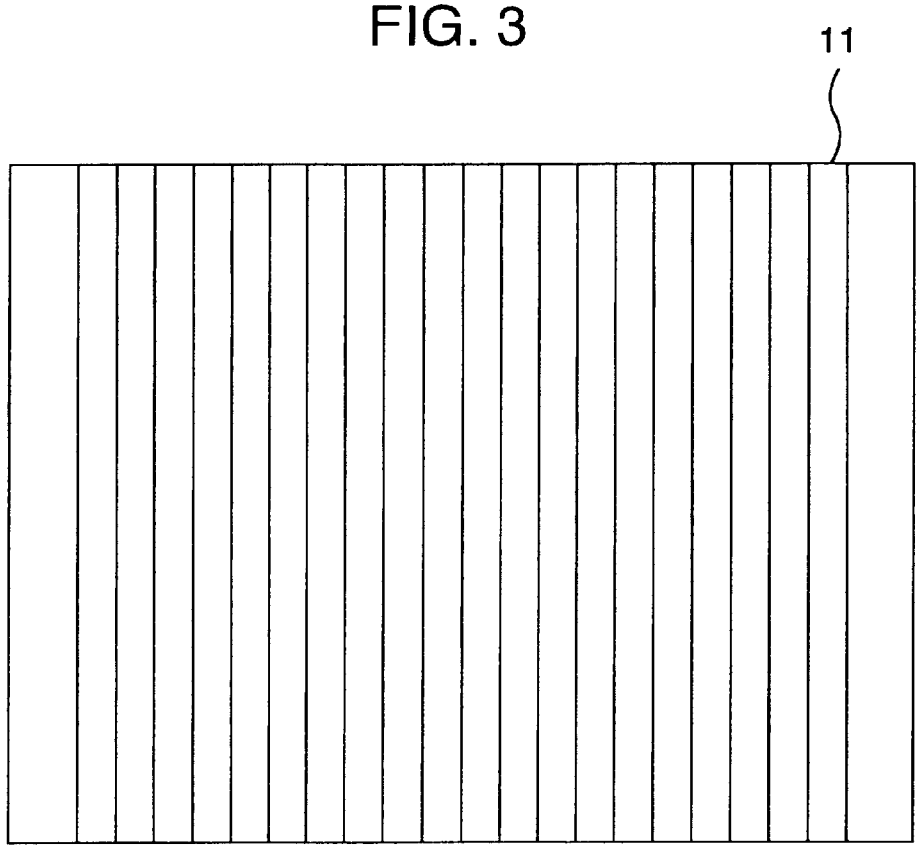
FIG. 3 is a plan view of a lenticular lens containing the hydrogenation product of the present invention.
Figure 4:
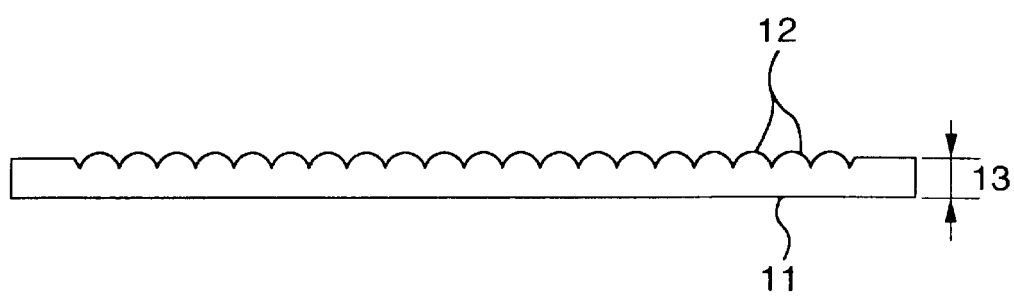
FIG. 4 is a sectional view of a lenticular lens containing the hydrogenation product of the present invention.

FIGS. 3 and 4 show a general shape of lenticular lens. Lenticular lens (11 in FIGS. 3 and 4) is disposed on the viewing side of a picture plane of display or the like and acts to widen the angle of visual field and sharpen the picture image. It generally has such a structure that pipe-shaped narrow and long streak-like curved faces (12 in FIG. 4) are formed in lines on one side of a thin resin plate so as to widen the angle of visual field. Thickness (13 in FIG. 4) is not limited, but is preferably 0.01–10 mm from the points of rigidity and easiness in handling. In the case of a large display of more than 15 inches, the thickness is preferably about 0.5–10 mm. Light transmittance (ASTM D103) is 80% or higher, preferably 90% or higher, more preferably 92% or higher over the total visible light range. The shape of the lenticular lens has no limitation, but shape of the curved faces (12 in FIG. 4) may be conocoids such as pipe, sine curve, elliptic curve and parabola.

The lenticular lens of the present invention has characteristics such as mechanical strength, impact strength, low water absorption and light weight. Therefore, it hardly deforms due to the influence of environmental temperature and humidity, and shows no distortion of images or blur of color when used for large-sized displays. Thus, the lenticular lens of the present invention is especially suitable as large-sized lenticular lenses of more than 10 inches, especially more than 15 inches which are used for screens for projection televisions or video projection. Furthermore, the lenticular lens of the present invention can have thin-walled and precision surface structure and, hence, is also suitable as lenses for transmission type screens of flat panel displays such as TFT and plasma displays.

<Agricultural Films>

The agricultural films of the present invention are obtained by molding a composition comprising the hydrogenation product of the thermoplastic dicyclopentadiene ring-opening polymer and, if necessary, other polymers or compounding ingredients. Molding into films is carried out by the aforementioned methods. Preferred is the melt molding method.

The resulting films may be used alone or may be laminated with films comprising other polymers. The lamination method is not limited, and mention may be made of extrusion lamination method, dry lamination method, hot-melt lamination method, solventless lamination method, co-extrusion lamination method, etc.

Thickness of the agricultural film of the present invention is optionally selected according to the object of use, and is usually 1–500 μm, preferably 10–300 μm, more preferably 20–200 μm, most preferably 50–150 μm because, in this case, mechanical strength, elongation, weathering resistance and light transmission are superior. The resulting films can be used without stretching as they are or stretched monoaxially or biaxially.

The agricultural films of the present invention are highly balanced in mechanical strength, elongation, chemical resistance, weathering resistance and light transmission, and, hence, are useful as films for houses for house cultivation, films for tunnel and films for seedbeds.

<Food Packaging Films>

Food packaging films mean films used packaging foods, namely, materials eaten or drunk by human beings or animals, such as meats, fishes, vegetables, fruits, cereals and cakes for keeping freshness, inhibition of contamination and protection against external causes.

Molding of the food packaging films of the present invention is carried out by the aforementioned methods, e.g., melt molding method and solution casting method. Preferred is the melt molding method.

The resulting films may be used alone or may be laminated with films comprising other polymers. The lamination method is not limited, and mention may be made of extrusion lamination method, dry lamination method, hot-melt lamination method, solventless lamination method, co-extrusion lamination method, etc.

Thickness of the food packaging films of the present invention is optionally selected according to the object of use, and is usually 1–500 μm, preferably 10–300 μm, more preferably 20–200 μm, because, in this case, mechanical strength, elongation and transparency are superior. The resulting films can be used without stretching as they are or stretched monoaxially or biaxially.

The food packaging films of the present invention are excellent in mechanical strength, elongation, oil resistance, transparency and water vapor barrier property, and, hence, are widely used as packaging materials for perishable foods such as vegetables, fruits, meats and fishes, frozen foods, cereals, cakes, breads and other various foods. Especially, they have the effect to keep freshness of vegetables and fruits, and are suitable as wrapping materials therefor.

<Impact-resistant Plate Members>

The impact-resistant plate members of the present invention are transparent impact-resistant plate members having a face of more than a specific area which are obtained by molding the hydrogenation product of the present invention to which other polymers or compounding ingredients are optionally added.

The impact-resistant plate members of the present invention are plates having impact resistance and weathering resistance sufficient to protect objects, for example, vehicles and human beings, from external environment and capable of forming partitions in space between the object and the external environment. The external environment includes, for example, (1) dust, rubbish, trash and other external impacts, (2) external environments such as sunlight (ultraviolet rays), rain and snow, and (3) acid, alkali and other chemicals.

As methods of protection using the impact-resistant plate members of the present invention, there are a method of protecting objects from external causes of specific direction such as rain, wind and sunlight by providing the impact-resistant plate members at a specific distance from the objects, such as roof and fence, and a method of protecting from external causes by completely covering the object. In the case of completely covering the object, the method includes completely covering with only the impact-resistant plate member or partly covering with the impact-resistant plate member, such as windows.

Size of the impact-resistant plate members of the present invention is usually 50 mm square or more, preferably 300 mm square or more, especially preferably 500 mm square or more, because the above-mentioned protection function is sufficiently exhibited.

Thickness of the impact-resistant plate members is optionally selected according to the object of use, and is usually 0.5–500 mm, preferably 1.0–300 mm, more preferably 3.0–100 mm for exhibiting the protecting function, because, in this case, mechanical strength, elongation, weathering resistance and light transmission are superior.

Shape of the impact-resistant plate members is such that when the shortest side (X) of the plate is assumed to be thickness direction, the ratio (Y/X) of the second shortest side (Y) and the shortest side is 2.0 or more, preferably 3.0 or more, most preferably 5.0 or more, because in this case, mechanical strength, elongation, weathering resistance and light transmission are superior.

The maximum deflection of a strip-shaped test piece of 40 mm in width and 100 mm in length of the impact-resistant plate members when a concentrated load of 5 g is applied to a free end of the cantilever is optionally selected according to the object of use, and is usually 80 mm or less, preferably 40 mm or less, more preferably 20 mm or less, most preferably 5 mm or less, because in this case, mechanical strength and weathering resistance are especially superior.

Total light transmittance of the impact-resistant plate members of the present invention is optionally selected according to the object of use, and is usually 10% or higher, preferably 30% or higher, more preferably 50% or higher, because in this case the members are suitable for outdoor use.

The impact-resistant plate members can be made by conventional molding methods, and, ordinarily, melt molding method can be employed.

In case the impact-resistant plate members are made by melt molding method, there may be employed melt extrusion methods such as a method using T-die and inflation method, calendering method, hot pressing method, injection molding method and the like. Among them, preferred is the melt extrusion method using T-die according to which unevenness in thickness can be diminished. Conditions of the melt molding methods can be optionally selected depending on the molding method. For example, in the case of the melt molding method using T-die, resin temperature is optionally selected within the range of from the glass transition temperature to the decomposition temperature, but is usually 100–400° C., preferably 150–350° C., more preferably 200–300° C., and take-off roll temperature is usually 0–200° C., preferably 30–180° C., more preferably 50–150° C.

The impact-resistant plate members of the present invention have highly balanced mechanical strength, elongation, chemical resistance, weathering resistance and light transmission, and, therefore, they are useful as large-sized transparent plate materials for outdoor use. Specifically, as uses for protection by providing a roof or partition at a specific distance from the object, mention may be made of, for example, roofs for car (vehicle) parking spaces such as car port and garage; housing exteriors and windows and partitions of grazing (sun-room, balcony, terrace, etc.); as uses for protection by completely covering the object, mention may be made of, for example, windows of vending machines; windows of showcases and showrooms; windows for vehicles such as sunroof, hood for chair lift, windows for gondola and windows for ropeway.

Furthermore, since the impact-resistant plate members of the present invention are suitable for outdoor use as mentioned above, they are also suitable as signboards, notice boards and signposts for superhighway.

EXAMPLES

The present invention will be explained in more detail by the following examples. These examples should not be construed as limiting the invention in any manner. The properties were measured by the following methods.

(1) Glass Transition Temperature

This was measured by differential scanning calorimetry (DSC method).

(2) Molecular Weight

This was measured in terms of polyisoprene by gel permeation chromatography (GPC) using cyclohexane as a solvent.

(3) Content of Low-molecular Weight Component

Content of low-molecular weight component (oligomer) was obtained by measuring the component of 2,000 or less in molecular weight in the GPC chart obtained in measurement of molecular weight mentioned above (shown by a shoulder or a small peak).

(4) Hydrogenation Rate

This was measured by $^1$H-NMR.

(5) Ratio of Cis/trans

The ratio (molar ratio) of cis-bond unit and trans-bond unit in the thermoplastic DCP ring-opening polymer was measured by 13C-NMR method.

This was determined as a ratio of cis:integrated value of peak group appearing around 42 ppm and trans:integrated value of peak group appearing around 47 ppm.

(6) Filtering Rate

A 5 wt % solution of the polymer in cyclohexane was prepared, and a filtering rate (g/min) when the solution was filtered by a PTFE filter (47 mmφ) having a pore diameter of 0.5 μm under a nitrogen pressure of 0.2 kgf/cm² was measured.

Example 1

<Ring-opening Polymerization>

5 Grams of tricyclo[4.3.1$^{2,6}$. 0$^{1,6}$]deca-3,7-diene (dicyclopentadiene(DCP), manufactured by Nippon Zeon Co., Ltd., purity: 95% by weight or higher) (hereinafter referred to as "initial charge portion") and 120 g of cyclohexane were charged in a 1 liter flask the inner atmosphere of which was replaced with nitrogen, and 0.57 mmol of tri-i-butylaluminum (iBu$_3$Al) and 0.57 mmol of isobutyl alcohol (iBuOH) as polymerization catalysts, 0.189 mmol of acetone as a reaction regulator, and 3.79 mmol of 1-hexene as a molecular weight modifier were added to the flask. Thereto was added 0.086 mmol of tungsten hexachloride, followed by stirring at 70° C. for 5 minutes. Then, with keeping the reaction system at 70° C., a mixed liquid of 45 g of DCP (hereinafter referred to as "subsequent addition portion") and 0.103 mmol of tungsten hexachloride was continuously added dropwise over a period of 30 minutes (divided successive addition method) to the reaction system. After completion of the addition, the reaction system was stirred for further 30 minutes to complete the ring-opening polymerization.

The resulting thermoplastic DCP ring-opening polymer had a content of low-molecular weight component (oligomer) of 0.9% by weight, a number-average molecular weight (Mn) of 10,800, a weight-average molecular weight (Mw) of 24,800, and a molecular weight distribution (Mw/Mn) of 2.30. The ratio (cis/trans) of cis-bond unit and trans-bond unit in this thermoplastic DCP ring-opening polymer was 75/25 (mol %).

This polymerization reaction mixture was adjusted to have a solid concentration of 5% by weight, and was filtered by a PTFE filter (47 mmφ) having an average pore diameter of 0.5 μm under a nitrogen pressure of 0.2 kgf/cm² to find that the filtering rate was high (filtering rate: 110 g/min).

<Hydrogenation>

The above polymerization reaction mixture was transferred to an autoclave of 1 liter, and then 160 g of cyclohexane was added thereto and further a mixture of 2.5 g of a nickel catalyst supported on diatomaceous earth and 5.15 g of 30 wt % solution of triisobutylaluminum in toluene was added. The inner atmosphere of the reaction vessel was replaced with hydrogen, followed by heating to 120° C. with stirring. When the temperature was stabilized, hydrogen pressure was raised to 20 kg/cm², and reaction was carried out for 6 hours with supplementing the hydrogen consumed during reaction. Then, 4.2 g of water and 2.5 g of active alumina (Neobead D powder manufactured by Mizusawa Chemical Co., Ltd.; surface area: 320 cm²/g; pore volume: 0.8 cm²/g; and average particle size: 15 μm) were added, followed by stirring at 80° C. for 1 hour and, then, filtering to remove solid matter. The resulting hydrogenation reaction mixture was poured into 3 liters of isopropyl alcohol to cause precipitation, and the precipitate was filtered off and recovered. The recovered hydrogenation product was dried at 100° C. for 48 hours under 1 Torr or lower. The hydrogenation rate of the hydrogenated product was 99.9%.

Example 2

Ring-opening polymerization and hydrogenation were carried out in the same manner as in Example 1, except that methyl ethyl ketone (MEK) was used in place of acetone used in Example 1 as reaction regulator.

Example 3

Ring-opening polymerization and hydrogenation were carried out in the same manner as in Example 1, except that acetone as the reaction regulator was previously mixed with tungsten hexachloride (hereinafter referred to as "premix addition method"), and 40% of the mixture was charged in the flask and 60% of the mixture was added to the system by division successive addition method in place of charging acetone in the flask (hereinafter referred to as "bottom addition method"), and the polymerization temperature was changed from 70° C. to 40° C.

Example 4

Ring-opening polymerization and hydrogenation were carried out in the same manner as in Example 3, except that a mixture of DCP and MTD [8-methyltetracyclo [4.4.0.12.8.17.10]-dodeca-3-ene (70/30 in weight for both the initial charge portion and the subsequent addition portion) was used in place of DCP used in Example 3.

Example 5

Ring-opening polymerization and hydrogenation were carried out in the same manner as in Example 1, except that t-butyronitrile was used in place of acetone used in Example 1 as a reaction regulator.

Example 6

Ring-opening polymerization and hydrogenation were carried out in the same manner as in Example 1, except that benzonitrile was used in place of acetone used in Example 1 as a reaction regulator.

Example 7

Ring-opening polymerization and hydrogenation were carried out in the same manner as in Example 1, except that isopropyl ether was used in place of acetone used in Example 1 as a reaction regulator.

Example 8

Ring-opening polymerization and hydrogenation were carried out in the same manner as in Example 1, except that methyl acetate was used in place of acetone used in Example 1 as a reaction regulator.

Example 9

Ring-opening polymerization and hydrogenation were carried out in the same manner as in Example 1, except that acetone as reaction regulator was not used. Some gel was produced, the filtering rate was low, and the hydrogenation rate was 98%, which was somewhat insufficient.

Example 10

Ring-opening polymerization and hydrogenation were carried out in the same manner as in Example 1, except that diethylaluminum chloride was used in place of tri-i-butylaluminum (the amount (mmol) was the same) and acetone as the reaction regulator was not used. Considerable gel was produced, the filtering rate could not be measured, and the hydrogenation could not be performed.

Example 11

Ring-opening polymerization and hydrogenation were carried out in the same manner as in Example 1, except that tetrabutyltin was used in place of tri-i-butylaluminum (the amount (mmol) was the same) and acetone as the reaction regulator was not used. Some gel was produced, the filtering rate was low, and the hydrogenation rate was 90%, which was insufficient.

Example 12

Ring-opening polymerization and hydrogenation were carried out in the same manner as in Example 1, except that 5.682 mmol of titanium tetrachloride was used in place of 0.189 mmol of tungsten hexachloride, amount of tri-i-butylaluminum was changed to 11.36 mmol, isobutyl alcohol was not used, 22.7 mmol of triethylamine was used in place of 0.189 mmol of acetone as a reaction regulator, and the polymerization temperature was changed to 40° C. During the polymerization, polymer produced was precipitated, and the polymerization reaction did not proceed, and the subsequent treatments were not conducted. Therefore, measurement of the properties was impossible. Residue of catalyst was in a large amount.

Polymerization formulation in the above examples and results of measurement of properties are shown in Table 1 and Table 2.

TABLE 1

| | Monomers | | Ring-opening polymerization catalysts | | | Reaction regulators | | | | Polymerization | Polymerization conversion |
|---|---|---|---|---|---|---|---|---|---|---|---|
| | Kind | Amount (mmol) | W (mmol) | Al (mmol) | IBuOH (mmol) | Components | Amount (mmol) | Method of addition | 1-Hexene (mmol) | temperature (° C.) | rate (%) |
| Example 1 | DCP | 0.397 | 0.189 | 0.57 | 0.57 | Acetone | 0.189 | Bottom | 3.79 | 70 | 100 |
| Example 2 | DCP | 0.397 | 0.189 | 0.57 | 0.57 | MEK | 0.189 | Bottom | 3.79 | 70 | 100 |
| Example 3 | DCP | 0.397 | 0.189 | 0.57 | 0.57 | Acetone | 0.189 | Premix | 3.79 | 40 | 100 |
| Example 4 | DCP/MTD = 70/30 | 0.397 | 0.189 | 0.57 | 0.57 | Acetone | 0.189 | Premix | 3.79 | 40 | 100 |
| Example 5 | DCP | 0.397 | 0.189 | 0.57 | 0.57 | t-Butyl-nitrile | 0.189 | Bottom | 3.79 | 70 | 100 |
| Example 6 | DCP | 0.397 | 0.189 | 0.57 | 0.57 | Benzo-nitrile | 0.189 | Bottom | 3.79 | 70 | 100 |
| Example 7 | DCP | 0.397 | 0.189 | 0.57 | 0.57 | Isopropyl ether | 0.189 | Bottom | 3.79 | 70 | 100 |
| Example 8 | DCP | 0.397 | 0.189 | 0.57 | 0.57 | Methyl acetate | 0.189 | Bottom | 3.79 | 70 | 100 |
| Example 9 | DCP | 0.397 | 0.189 | 0.57 | 0.57 | — | — | — | 3.79 | 70 | 100 |
| Example 10 | DCP | 0.397 | 0.189 | 0.57 | 0.57 | — | — | — | 3.79 | 70 | — |
| Example 11 | DCP | 0.397 | 0.189 | 0.57 | 0.57 | — | — | — | 3.79 | 70 | 100 |
| Example 12 | DCP | 0.397 | 5.682 | 11.36 | No | Triethyl-amine | 22.727 | Bottom | 3.79 | 40 | 75 |

(Notes)

(1) DCP: Dicyclopentadiene (2) MTD: 8-Methyltetracyclo-[4.4.0.12.8.17.10]-dodeca-3-ene (3) W: Tungsten hexachloride (titanium tetrachloride was used in Example 4)

(4) Al: Tri-i-butylaluminum (which was alkoxylated with iBuOH; diethylaluminum chloride was used in Example 2, and tetrabutyltin was used in Example 3)

(5) MEK: Methyl ethyl ketone

TABLE 2

| | Filtration rate (g/min) | Oligomers (wt %) | Cis/trans |
|---|---|---|---|
| Example 1 | 110 | 0.9 | 75/25 |
| Example 2 | 102 | 1.2 | 74/26 |
| Example 3 | 115 | 0.5 | 77/23 |
| Example 4 | 119 | 0.3 | 75/25 |
| Example 5 | 95 | 1.1 | 80/20 |
| Example 6 | 90 | 1.2 | 79/21 |
| Example 7 | 80 | 1.4 | 74/26 |
| Example 8 | 120 | 1.9 | 76/24 |
| Example 9 | 5 | 11 | 75/25 |
| Example 10 | Measurement impossible | Measurement impossible | Measurement impossible |
| Example 11 | 8 | 13 | 77/23 |
| Example 12 | Measurement impossible | Measurement impossible | 30/70 |

| | Molecular weight | | | Hydrogenation rate (%) |
|---|---|---|---|---|
| | Mn | Mw | Mw/Mn | |
| Example 1 | 10,800 | 24,800 | 2.30 | 99.9 |
| Example 2 | 11,900 | 28,500 | 2.39 | 99.9 |
| Example 3 | 11,200 | 24,600 | 2.20 | 99.9 |
| Example 4 | 10,800 | 22,100 | 2.05 | 99.9 |
| Example 5 | 10,200 | 24,500 | 2.40 | 99.9 |
| Example 6 | 12,000 | 30,000 | 2.50 | 99.9 |
| Example 7 | 12,000 | 25,500 | 2.00 | 99.9 |
| Example 8 | 11,000 | 25,300 | 2.30 | 99.9 |
| Example 9 | 9,000 | 25,500 | 3.44 | 98 |
| Example 10 | Gel | Measurement impossible | — | Hydrogenation impossible |
| Example 11 | 7,000 | 25,200 | 3.60 | 90 |
| Example 12 | Precipitation | Measurement impossible | — | Hydrogenation impossible |

(Wire Coating Material)

Next, explanation will be made of embodiments in which the hydrogenation products of the present invention were used for wire coating materials. Measurement of (1) glass transition temperature, (2) molecular weight, (3) content of low-molecular weight component, (4) hydrogenation rate, and (5) cis/trans ratio was conducted in the manner as aforementioned.

<Evaluated items>

Alternating break-down voltage: This was measured in accordance with UPT under the conditions of 5 kV/10 min after 97 kv/10 min, and 105 kV/10 min.

Water tree resistance: The cables were dipped in warm water of 70° C., followed by applying a voltage of 1 KHz, 38 KV for 60 days, and water tree resistance was-shown by the number of generation of water tree (relative value).

Flexing resistance: The cables were wound round a cylinder of 300 mm$\phi$ in diameter and left to stand, and after lapse of a given period, generation of cracks was examined.

Example 13

<Synthesis of Cyclic Olefin Polymer>

100 Parts by weight of the hydrogenation product of Example 1 (hereinafter referred to as "hydrogenation product (a)"; Tg: 97° C.) was mixed with 0.2 part by weight of pentaerythrityl-tetrakis(3-(3,5-di-tertiary-butyl-4-hydroxyphenyl)propionate) as a phenolic aging inhibitor, followed by kneading with a twin-screw kneader. The strands (rod-like molten resin) were passed through a strand cutter to obtain a wire coating material in the form of pellets (granules).

<Production of electric wire>

An inner semiconductor layer (1 mm thick), a cyclic olefin polymer insulation coating layer (2 mm thick) and an outer semiconductor layer (1 mm thick) were formed on a copper conductor of 19 mm$\phi$ in outer diameter by three-layer coaxial extrusion of the resulting pellets for coating wires with heating and melting by an extrusion molding machine to produce a power cable.

<Evaluation of Characteristics>

The power cable was evaluated by the above evaluation methods to obtain an alternating break-down voltage of 780 KV, a water tree generation rate of 6, and a crack formation rate (after lapse of 1 month) of 0%.

Example 14

<Synthesis of Cyclic Olefin Polymer>

ETD/DCP was ring-opening polymerized in the same manner as in Example 13, using 15 parts by weight of 8-ethyl-tetracyclo[$4.4.1^{2,5}.1^{7,10}.0$]-dodeca-3-ene (atetracyclic norbornene; hereinafter referred to as "ECD") and 85 parts by weight of DCP (100 parts by weight in total) in place of 100 parts by weight of DCP. The resulting ring-opening polymer had a cis content of 75% and contained 0.2% of a component of 200 or less in molecular weight. The resulting polymer was hydrogenated in the same manner as in Example 1 to obtain a ring-opening copolymer hydrogenation product (hereinafter referred to as "hydrogenation product (b)"). Copolymeric ratio of the respective norbornenes in the polymer was calculated from the composition of the residual norbornenes in the solution after polymerization (according to gas chromatograpy) to obtain ETD/DCP=15/85, which was nearly equal to the charged composition. This ETD/DCP ring-opening polymer hydrogenation product had an Mn of 40,000, a hydrogenation rate of 99.8%, and a Tg of 105° C.

A power cable was produced in the same manner as in Example 13, except for using the resulting cyclic olefin polymer hydrogenation product (b), and the the resulting cable was evaluated on production to obtain an alternating break-down voltage of 790 KV, a water tree generation rate of 7, and a crack formation rate (after lapse of 1 month) of 0%.

Example 15

To 100 parts by weight of the hydrogenation product (a) of Example 1 were added 0.2 part by weight of pentaerythrityl-tetrakis(3-(3,5-di-tertiary-butyl-4-hydroxyphenyl)propionate) as a phenolic aging inhibitor and 5 parts by weight of 2,5-dimethyl-2,5-di(t-butylperoxy) hexyne-3,2,5-dimethylhexane-2,5-dihydroperoxide, followed by kneading with a twin-screw kneader, and the resulting strands (molten resin in the form of rod) were cut by a strand cutter to obtain a wire coating material in the form of pellets (granules).

Thereafter, a power cable was produced in the same manner as in Example 13, and was evaluated on production to obtain an alternating break-down voltage of 798 KV, a water tree generation rate of 2, and a crack formation rate (after lapse of 1 month) of 0%.

Example 16

To 100 parts by weight of the hydrogenation product (a) used in Example 1 were added 0.2 part by weight of pentaerythrityl-tetrakis(3-(3,5-di-tertiary-butyl-4-hydroxyphenyl)propionate) as a phenolic aging inhibitor and 20 parts by weight of a hydrogenated styrene-butadienestyrene block copolymer (Toughtec H1051 manufactured by Asahi Chemical Industry Co., Ltd.; in the form of crumb), followed by kneading with a twin-screw kneader, and the resulting strands (molten resin in the form of rods) were cut by a strand cutter to obtain a wire coating material in the form of pellets (granules).

Thereafter, a power cable was produced in the same manner as in Example 13, and was evaluated on production to obtain an alternating break-down voltage of 796 KV, a water tree generation rate of 4, and a crack formation rate (after lapse of 1 month) of 0%.

Example 17

A power cable was produced in the same manner as in Example 13, except that a crosslinked polyethylene insulation coating material was used as the wire coating material in place of the cyclic olefin polymer hydrogenated product, and the power cable was evaluated on production to obtain an alternating break-down voltage of 520 KV, a water tree generation rate of 100, and a crack formation rate (after lapse of 1 month) of 0%.

The resulting electric wire was cut and the section was observed to find that the conductor somewhat deviated from the center.

Example 18

The ring-opening polymer hydrogenation product (a) obtained in Example 1 and the crosslinked polyethylene used in Example 17 were mixed at 50:50 (weight ratio), and 100 parts by weight of the resulting blend was mixed with 5 parts by weight of a hydrogenated styrene-butadiene-styrene block copolymer (Toughtec H1051 manufactured by Asahi Chemical Industry Co., Ltd.; in the form of crumb), followed by kneading with a twin-screw kneader, and the resulting strands (molten resin in the form of rods) were cut by a strand cutter to obtain a wire coating material in the form of pellets (granules).

Thereafter, a power cable was produced in the same manner as in Example 13, and was evaluated to obtain an alternating break-down voltage of 710 KV, a water tree generation rate of 30, and a crack formation rate (after lapse of 1 month) of 0%.

The resulting electric wire was cut and the section was observed to find no deviation of the conductor from the center.

(Plate Lens)

Next, explanation will be made of embodiments in which the hydrogenation products of the present invention were used for plate lenses. Parts and % are by weight, unless otherwise notified. Measurement of (1) glass transitiontemperature, (2) molecular weight, (3) content of low-molecular weight component, (4) hydrogenation rate, and (5) cis/trans ratio was conducted in the manner as aforementioned. Other evaluation methods are as follows.

Light Transmission Test

Measurement was conducted on a sheet (hereinafter referred to as "substrate") obtained by the melt extrusion molding method in accordance with ASTM D103.

Cracking Test at Molding

In production of the substrates, ten lenses of the thermoplastic hydrocarbon resin were made and it was observed whether they were fractured or cracked. When none of the ten lenses were fractured or cracked, this is indicated by ⊚ (excellent); when seven to nine lenses among the ten lenses were not fractured or cracked, this is indicated by ○ (good); when seven to nine lenses among the ten lenses were fractured or cracked, this is indicated by Δ (somewhat bad); and when all of the ten lenses were fractured or cracked, this is indicated by × (bad).

Moisture Absorption Distortion Test

The thermoplastic hydrocarbon resin plate lens for test was left to stand in a high-temperature and high-humidity bath at 23° C. and a humidity of 60% for 1 week, and it was examined whether distortion (warpage) of the lens due to moisture absorption occurred or not. When no warpage occurred, this is indicated by ⊚ (good), and when warpage occurred, this is indicated by × (bad).

Drop Test

A missile-shaped bullet of ¾ inch in radius (50 g) was dropped under gravity on the side of the lens opposite to the side having lens grooves from the height of 1 m, and it was observed whether the lens was fractured or cracked. When none of the ten lenses were fractured or cracked, this is indicated by ⊚ (excellent); when seven to nine lenses among the ten lenses were not fractured or cracked, this is indicated by ○ (good); when one to six lenses among the ten lenses were not fractured or cracked, this is indicated by Δ (somewhat bad); and when all of the ten lenses were fractured or cracked, this is indicated by × (bad).

<Synthesis of Polymer>

Example 19

100 Grams of 8-methyl-8 methoxycarbonyltetracyclo [$4.4.0.1^{2,5}.1^{7,8}$]-dodeca-3-ene, 60 g of 1,2-dimethoxyethane, 240 g of cyclohexane, 25 g of 1-hexene, and 3.4 ml of a solution of 0.96 mol/l of diethylaluminum chloride in toluene were added to an autoclave of 1 liter in internal space. 20 Milliliters of a solution containing 0.05 mol/l of tungsten hexachloride in 1,2-didimethoxyethane and 10 ml of a solution containing 0.1 mol/l of paraldehyde in 1,2-didimethoxyethane were mixed in a separate flask. 4.9 Milliliters of this mixed solution was added to the mixture in the autoclave. After hermetically sealing the autoclave, the mixture was heated to 80° C. and stirred for 3 hours. To the resulting polymer solution was added a mixed solvent of 1,2-didimethoxyethane and cyclohexane at 2/8 (weight ratio) to adjust the polymer/solvent ratio to 1/9 (weight ratio), followed by adding 20 g of triethanolamine and stirring for 10 minutes. To this polymer solution was added 500 g of methanol, followed by stirring for 30 minutes and leaving the solution to stand. The solution separated into two layers. The upper layer was removed, and methanol was added again, followed by stirring, leaving it to stand and removing the upper layer. The same procedure was further repeated twice, and the resulting lower layer was suitably diluted with cyclohexane and 1,2-didimethoxyethane to obtain a cyclohexane-1,2-didimethoxyethane solution of 10% in polymer concentration. To this solution was added 20 g of palladium/silica magnesia (manufactured by Nikki Chemical Co., Ltd.; palladium content: 5%), followed by carrying out the reaction in an autoclave under a hydrogen pressure of 40 kg/cm² at 165° C. for 4 hours. Thereafter, the hydrogenation catalyst was removed by filtration to obtain a hydrogenated polymer solution. To this hydrogenated polymer solution was added pentaerythrityl-tetrakis[3-(3,5-di-tertiary-butyl-4-hydroxyphenyl)propionate] as an antioxidant in an amount of 0.1% based on the hydrogenated polymer, followed by subjecting to desolvation at 380° C. under vacuum drying. Then, the molten resin was pelletized by an extruder in a nitrogen atmosphere to obtain a thermoplastic hydrocarbon resin having a weight-average molecular weight of 88,000, an Mw/Mn of 3.3, a hydrogenation rate of 99.5%, and a glass transition temperature of 168° C. (hereinafter referred to as "resin (c)"). The proportion of the repeating units having alicyclic structure was 100% by weight, and the proportion of the repeating units having alicyclic structure containing no norbornane ring was 0% by weight.

Example 20

66 Mol % of ethylene and 34 mol % of 8-methyl-tetracyclo[4.4.0.1$^{2,5}$·1$^{7,8}$]dodeca-3-ene were polymerized and pelletized to obtain a thermoplastic resin having an intrinsic viscosity of 0.64 dl/g (in decalin at 35° C.) and a glass transition temperature of 140° C. (hereinafter referred to as "resin (d)"). The proportion of the repeating units having alicyclic structure was 75% by weight, and the proportion of the repeating units having alicyclic structure containing no norbornane ring was 0% by weight.

Example 21
<Production of Substrate>

The pellets of hydrogenation product (a) obtained in Example 1 were heated and kneaded by an extruder, melt extrusion molded from T-die (resin temperature 220° C.), passed between rolls, cooled, and then cut to a given size to obtain a substrate of 300×300×3 mm.
<Molding of Thermoplastic Hydrocarbon Resin Fresnel Lens>

The above substrate was placed in a mold for thermoplastic hydrocarbon resin Fresnel lens and molded by a hot press under the conditions of a molding temperature of 150° C., a molding time of 10 minutes, and a molding pressure of 30 kg/cm$^2$, followed by cooling with water for 10 minutes to obtain a molded product. The shape of the Fresnel lens portion was such that the outermost peripheral diameter was 200 mm, and the spherically curved face was divided into 20 parts. This lens had a light transmittance of 90% or higher, none of ten lenses were fractured or cracked at molding and-thus they were good, and moisture absorption distortion in a high-temperature and high-humidity bath was not seen. Furthermore, they showed good results in drop test.

Example 22
<Production of Substrate>

A substrate of 300×300×3 mm was obtained in the same manner as in Example 21, except that the hydrogenation product (c) of Example 19 was used and the resin temperature was changed to 280° C.
<Molding of Thermoplastic Resin Fresnel Lens>

A thermoplastic resin Fresnel lens molded product was obtained in the same manner as in Example 21, except that the molding temperature of the substrate was changed to 210° C.

Seven lenses among ten lenses were fractured or cracked at molding and thus the lenses were somewhat bad, and occurrence of warpage was seen as moisture absorption distortion in high-temperature and high-humidity bath and thus they were bad. All of the ten lenses were fractured or cracked in the drop test, and thus they were bad.

Example 23
<Production of Substrate>

A substrate of 300×300×1 mm was obtained in the same manner as in Example 21, using an acrylic resin Acrypet VH manufactured by Mitsubishi Rayon Co., Ltd. (hereinafter referred to as "resin (e)"). Recurring unit having alicyclic structure in the resin was 0%.
<Molding of Thermoplastic Resin Fresnel Lens>

A thermoplastic resin Fresnel lens molded product was obtained in the same manner as in Example 21, except that the molding temperature of the substrate was changed to 160° C.

All of ten lenses were fractured or cracked at molding and thus the lenses were bad, and occurrence of warpage was seen as moisture absorption distortion in a high-temperature and high-humidity bath, and these lenses were bad. Furthermore, all of the ten lenses were fractured or cracked in the drop test, and they were bad.

Example 24
<Production of Substrate>

The pellets of hydrogenation product (a) obtained in Example 1 were heated and kneaded by an extruder, melt-extrusion molded from T-die (resin temperature 220° C.), passed between rolls, cooled, and then cut to a given size to obtain a substrate of 850×651×1 mm.
<Molding of Lenticular Lens>

The above substrate was placed in a lenticular lens mold and molded by a hot press under the conditions of a molding temperature of 150° C., a molding time of 10 minutes, and a molding pressure of 30 kg/cm followed by cooling with water for 10 minutes to obtain a molded product. As to the lenticular lens mold used, the sectional shape of the lenticular lens was circular arcs of 0.5 mm in pitch and 85° in center angle. Size of the effective face of the resulting lenticular lens was 813×610 mm. This lens had a light transmittance of 90% or higher, none of ten lenses were fractured or cracked at molding and thus they were satisfactory, and moisture absorption distortion in a high-temperature and high-humidity bath was not seen. Furthermore, they showed good results in the drop test.

Example 25
<Production of Substrate>

A substrate of 850×651×1 mm was obtained in the same manner as in Example 24, except that the hydrogenation product (c) of Example 19 was used and the resin temperature was changed to 280° C.
<Molding of Lenticular Lens>

A lenticular lens molded product was obtained in the same manner as in Example 24, except that the molding temperature of the substrate was changed to 210° C.

Seven lenses among ten lenses were fractured or cracked at molding and thus the lenses were somewhat bad, and occurrence of warpage was seen as moisture absorption distortion in a high-temperature and high-humidity bath and these lenses were bad. Only one of the ten lenses was not fractured or cracked in the drop test, and they were somewhat bad.

Example 26
<Production of Substrate>

A substrate of 850×651×1 mm was obtained in the same manner as in Example 24, except that the hydrogenation product (d) of Example 20 was used and the resin temperature was changed to 230° C.
<Molding of Lenticular Lens>

A lenticular lens molded product was obtained in the same manner as in Example 24, except that the molding temperature of the substrate was changed to 160° C.

Seven lenses among ten lenses were fractured or cracked at molding and thus the lenses were somewhat bad, and moisture absorption distortion in a high-temperature and high-humidity bath was not seen, and thus the lenses were good. Only one of the ten lenses was not fractured or cracked in the drop test, and they were somewhat bad.

Example 27
<Production of substrate>

A substrate of 850×651×1 mm was obtained in the same manner as in Example 24, using the resin (e), namely, an acrylic resin Acrypet VH manufactured by Mitsubishi Rayon Co., Ltd.

<Molding of Lenticular Lens>

A lenticular lens molded product was obtained in the same manner as in Example 24, except that the molding temperature of the substrate was changed to 160° C.

Ten lenses among ten lenses were fractured or cracked at molding and thus the lenses were bad, and occurrence of warpage was seen as moisture absorption distortion in a high-temperature and high-humidity bath and the lenses were bad. All of the ten lenses were fractured or cracked in the drop test, and they were bad.

The test results are shown in Tables 3 and 4.

TABLE 3

Test results on properties of Fresnel lenses

| | Materials | Cracking test at molding | Moisture absorption distortion test | Drop test | Overall evaluation |
|---|---|---|---|---|---|
| Example 21 | Hydrogenation product (a) | ⊚ | ⊚ | ⊚ | ⊚ |
| Example 22 | Hydrogenation product (c) | Δ | X | X | X |
| Example 23 | Resin (e) | X | X | X | X |

TABLE 4

Test results on properties of lenticular lenses

| | Materials | Cracking test at molding | Moisture absorption distortion test | Drop test | Overall evaluation |
|---|---|---|---|---|---|
| Example 24 | Hydrogenation product (a) | ⊚ | ⊚ | ⊚ | ⊚ |
| Example 25 | Hydrogenation product (c) | Δ | X | Δ | X |
| Example 26 | Resin (d) | Δ | ○ | Δ | Δ |
| Example 27 | Resin (e) | X | X | X | X |

(Agricultural Film)

Next, explanation will be made of embodiments in which the hydrogenation products of the present invention were used for agricultural films. Parts and % are by weight, unless otherwise notified. Measurement of (1) glass transition temperature, (2) molecular weight, (3) content of low-molecular weight component, (4) hydrogenation rate, and (5) cis/trans ratio was conducted in the manner as aforementioned. Other evaluation methods are as follows.

Mechanical Strength

Mechanical strength test of the film was conducted in the following manner. A test piece of 30 cm×30 cm was tensioned at a jig exclusively made and then horizontally fixed. An iron ball of 500 g was dropped from the vertical direction and it was observed whether the test film was broken or not. The mechanical strength was determined by the number of the tests in which the test film was broken in the tests of ten times.

⊚: The test piece was never broken in the tests of ten times.

○: The test pieces were broken 1–2 times in the tests of ten times.

Δ: The test pieces were broken 3–5 times in the tests of ten times.

X: The test pieces were broken 6–10 times in the tests of ten times.

Tensile Elongation

This was measured in accordance with JIS 7127 and evaluated by the following criteria.

⊚: 10% or more

○: 5% or more and less than 10%

Δ: 1% or more and less than 5%

X: Less than 1%

Light Transmission

Total light transmittance was measured by an absorbance meter, and was evaluated by the following criteria.

⊚: 90% or higher

○: 80% or higher and lower than 90%

Δ: 50% or higher and lower than 80%

X: Lower than 50%

Weathering Resistance

Weathering resistance test on the film was conducted by the following methods.

(1) The test piece was exposed to carbon arc for a given period of time with making one revolution of the test piece per 1 minute round the light source in accordance with JIS 5400 using a sunshine weatherometer under the conditions of a black panel temperature of 35° C. with rainfall (18 minutes/120 minutes). The weathering resistance was evaluated in terms of reduction of total light transmittance of the film after the test, and judged according to the following criteria.

⊚: Reduction of the total light transmittance was less than 0.1%.

○: Reduction of the total light transmittance was 0.1% or more and less than 10%.

Δ: Reduction of the total light transmittance was 10% or more and less than 30%.

X: Reduction of the total light transmittance was 30% or more.

(2) The surface state of the film after subjected to outdoor exposure for 10 months and 20 months was visually observed.

⊚: The film had no haze and no yellowishness, and was transparent.

○: The film had no haze and had yellowishness, but was transparent.

Δ: The film had haze and yellowishness, but was slightly transparent.

X: The film had haze and yellowishness, and was opaque.

Chemical Resistance

A cloth soaked with salad oil was applied to the test piece, and solvent cracks which occurred after keeping them for 60 minutes were visually observed to test the chemical resistance. When neither white flaws nor discoloration occurred, this was judged to be good.

Examples 28–30

The hydrogenation product (b) obtained in Example 14, the hydrogenation product obtained in Example 4 (hereinafter referred to as "hydrogenation product (f)"; Tg: 118° C.), and APL-6509T (manufactured by Mitsui Chemical Co., Ltd.; containing 35% by weight of repeating units having alicyclic structure in which those having no norbornabe ring was 0%, and other repeating units were polyethylene chains; hereinafter referred to as "resin (g)") were used, and to 100 parts by weight of each of these resin components were added 0.1 part by weight of a phenolic aging inhibitor pentaerythrityl-tetrakis(3-(3,5-di-tertiary-butyl-4-hydroxyphenyl)propionate) as an antioxidant, 0.3 part by weight of Cyasorb UV-3346 (manufactured by Cypro Kasei Co., Ltd.) as a light stabilizer, and 0.2 part by weight of SEESORB 709 (manufactured by Cypro Kasei Co., Ltd.) as an ultraviolet absorber. Each of the resulting mixtures was extruded from a T-die of 400 mm in width of an extruder of screw diameter 65 mm at a resin temperature of 260° C., and taken-off by a roll of 85° C. to obtain a resin film of 100 μm thick. The resin films obtained from the hydrogenation product (b), the hydrogenation product (f) and the resin (g) were called (I-b), (I-f) and (I-g), respectively. Weathering resistance, chemical resistance, mechanical strength, elongation and light transmittance of the resin films (I-b), (I-f) and (I-g) were measured, and the results are shown in Table 5.

repeating units having alicyclic structure were in an amount of 100% by weight, and the repeating units having alicyclic structure and having no norbornane structure were in an amount of 85% by weight. Moreover, cis content of the resulting ring-opening polymer was 78%.

The above polymerization reaction mixture was transferred to an autoclave of 1 liter, and then 160 g of cyclohexane was added thereto. Thereto were added 2.5 g of a nickel catalyst supported on diatomaceous earth as a hydrogenation catalyst and 2.5 g of active alumina (Neobead D powder manufactured by Mizusawa Chemical Co., Ltd.; surface area: 320 cm$^2$/g; pore volume: 0.8 cm$^3$/g; and average particle size: 15 μm ), and the inner atmosphere of the reaction vessel was replaced with hydrogen, followed by raising the pressure to about 10 kg/cm$^2$ and heating to 160° C. with stirring. When the temperature was stabilized, the

TABLE 5

| | Resin films | Weathering resistance (A) | Weathering resistance (B) | | Chemical resistance | Mechanical strength | Elongation | Light transmission |
| --- | --- | --- | --- | --- | --- | --- | --- | --- |
| | | | 10 months | 20 months | | | | |
| Example 28 | I-b | ⊚ | ⊚ | ⊚ | ⊚ | ⊚ | ⊚ | ⊚ |
| Example 29 | I-f | ⊚ | ⊚ | ◯ | ⊚ | ⊚ | ⊚ | ⊚ |
| Example 30 | I-g | ◯ | ◯ | Δ | Δ | Δ | Δ | ◯ |

It can be seen from Table 5 that the films obtained from the thermoplastic dicyclopentadiene ring-opening polymers of the present invention showed good results in all of the tests. It can also be seen that among the thermoplastic dicyclopentadiene ring-opening polymers, those which were greater in % by weight of the repeating units having alicyclic structure (Examples 28 and 29: 100% by weight) were superior to those which were less in repeating units having alicyclic structure (examples 30: 35% by weight) in all of weathering resistance, chemical resistance, mechanical strength and light transmittance. It can be further seen that among the films comprising the thermoplastic dicyclopentadiene ring-opening polymers having 100% by weight of repeating units of alicyclic structure (Examples 28 and 29), the film larger in the repeating units having no norbornane structure was especially excellent (Example 28>Example 29).

Example 31

5 Grams of dicyclopentadiene monomer and 120 g of cyclohexane were charged in a 1 liter flask the inner atmosphere of which was replaced with nitrogen, and 0.57 mmol of tri-i-butylaluminum (iBu$_3$Al) as a polymerization catalyst, 0.57 mmol of isobutyl alcohol and 0.189 mmol of acetone as reaction regulators, and 3.79 mmol of 1-hexene as a molecular weight modifier were added to the flask. Thereto was added 0.076 mmol of tungsten hexachloride, followed by stirring at 60° C. for 5 minutes. Then, with keeping the reaction system at 60° C., 45 g of dicyclopentadiene monomer and a mixed solution of 0.114 mmol of tungsten hexachloride and cyclohexane were continuously added dropwise to the reaction system. After completion of the addition, the reaction system was stirred for further 30 minutes to complete the ring-opening polymerization.

The thus obtained ring-opening polymer had a weight-average molecular weight (Mw) of 26,300. Since no peak of unreacted monomer was detected in analysis of this reaction mixture by gas chromatography, it was confirmed that the reaction rate was 100%. Thus, it was confirmed that the hydrogen pressure was kept at 40 kg/cm$^2$, and reaction was carried out for 8 hours with supplementing the hydrogen consumed during reaction. After completion of the hydrogenation reaction, the hydrogenation catalyst and the active alumina were removed by filtration, and the hydrogenation reaction mixture was poured into 3 liters of isopropyl alcohol to cause precipitation, and the precipitate was filtered off and recovered. The recovered resin was dried at 100° C. for 48 hours under 1 Torr or lower. The resulting polymer was called hydrogenation product (h). The weight-average molecular weight (Mw) of the hydrogenation product (h) was 52,600, and the proportion of the component having a molecular weight of 2,000 or less was 0.5% by weight. The hydrogenation rate of the hydrogenated product (h) was 99.9%, and the glass transition temperature thereof was 103° C.

Example 32

5 Grams of a mixed monomer of dicyclopentadiene and methyltetracyclododecene (85:15) and 120 g of cyclohexane were charged in a 1 liter flask the inner atmosphere of which was replaced with nitrogen, and 0.57 mmol of tri-i-butylaluminum (iBu$_3$Al) as a polymerization catalyst, 0.57 mmol of isobutyl alcohol as a reaction regulator and 3.79 mmol of 1-hexene as a molecular weight modifier were added to the flask. Thereto was added 0.076 mmol of tungsten hexachloride, followed by stirring at 60° C. for 5 minutes. Then, with keeping the reaction system at 60° C., 45 g of a mixed monomer of dicyclopentadiene and methyltetracyclododecene (85:15) and a mixed solution of 0.114 mmol of tungsten hexachloride and cyclohexane were continuously added dropwise to the reaction system. After completion of the addition, the reaction system was stirred for further 30 minutes to complete the ring-opening polymerization.

Since no peak of unreacted monomer was detected in analysis of this reaction mixture solution by gas chromatography, it was confirmed that the reaction rate was 100%. Thus, it was confirmed that the repeating units having alicyclic structure were in an amount of 100% by weight, and the repeating units having alicyclic structure and having no norbornane structure were also in an amount of 100% by weight.

The above polymerization reaction mixture solution was transferred to an autoclave of 1 liter, and then 160 g of cyclohexane was added thereto. Thereto were added 2.5 g of a nickel catalyst supported on diatomaceous earth as a hydrogenation catalyst and 2.5 g of active alumina (Neobead D powder manufactured by Mizusawa Chemical Co., Ltd.; surface area: 320 $cm^2/g$; pore volume: 0.8 $cm^3/g$; and average particle size: 15 μm), and the inner atmosphere of the reaction vessel was replaced with hydrogen, followed by raising the pressure to about 10 $kg/cm^2$ and heating to 160° C. with stirring. When the temperature was stabilized, the hydrogen pressure was kept at 40 $kg/cm^2$, and reaction was carried out for 8 hours with supplementing the hydrogen consumed during reaction. After completion of the hydrogenation reaction, the hydrogenation catalyst and the active alumina were removed by filtration, and the hydrogenation reaction mixture was poured into 3 liters of isopropyl alcohol to cause precipitation, and the precipitate was filtered off and recovered. The recovered resin was dried at 100° C. for 48 hours under 1 Torr or lower. The resulting polymer was called hydrogenation product (i). The weight-average molecular weight (Mw) of the hydrogenation product (i) was 53,500, and the proportion of the component having a molecular weight of 2,000 or less was 4% by weight. The hydrogenation rate of the hydrogenated product (i) was 99.9%, and the glass transition temperature thereof was 97° C. Furthermore, cis content of the resulting ring-opening polymer was 79%.

Example 33

A ring-opening polymer was prepared in the same manner as in Example 32, except that the reaction temperature was 70° C., and the resulting polymer was hydrogenated. The repeating units having alicyclic structure were in an amount of 100% by weight, and the repeating units having alicyclic structure and having no norbornane structure were also in an amount of 100% by weight. The resulting polymer was called hydrogenation product (j). The weight-average molecular weight (Mw) of the hydrogenation product (j) was 55,300, and the proportion of the component having a molecular weight of 2,000 or less was 8% by weight. The hydrogenation rate of the hydrogenated product (j) was 99.9%, and the glass transition temperature thereof was 97° C. Furthermore, cis content of the resulting ring-opening polymer was 79%.

Examples 34–36

To 100 parts by weight of each of the hydrogenation products (h)–(j) obtained in Examples 31–34 were added 0.1 part by weight of a phenolic aging inhibitor pentaerythrityl-tetrakis(3-(3,5-di-tertiary-butyl-4-hydroxyphenyl) propionate) as an antioxidant, 0.3 part by weight of Cyasorb UV-3346 (manufactured by Cypro Kasei Co., Ltd.) as a light stabilizer, and 0.2 part by weight of SEESORB 709 (manufactured by Cypro Kasei Co., Ltd.) as an ultraviolet absorber. Each of the resulting mixtures was extruded from a T-die of 400 mm in width of an extruder of screw diameter 65 mm at a resin temperature of 260° C., and taken-off by a roll of 85° C. to obtain a resin film of 100 μm thick. The resin films obtained from the hydrogenation products (h), (i) and (j) were called (I-h), (I-i) and (I-j), respectively.

Weathering resistance, chemical resistance, mechanical strength, elongation and light transmittance of the resin films (I-h), (I-i) and (I-j) were measured, and the results are shown in Table 6.

TABLE 6

| | Resin films | Weathering resistance (A) | Weathering resistance (B) 10 months | Weathering resistance (B) 20 months | Chemical resistance | Mechanical strength | Elongation | Light transmission |
|---|---|---|---|---|---|---|---|---|
| Example 34 | I-h | ⊚ | ⊚ | ⊚ | ⊚ | ⊚ | ⊚ | ⊚ |
| Example 35 | I-i | ⊚ | ⊚ | ⊚ | ⊚ | ○ | ⊚ | ⊚ |
| Example 36 | I-j | ⊚ | ⊚ | ⊚ | ○ | ○ | ○ | ⊚ |

The thermoplastic dicyclopentadiene ring-opening polymers in which all of the repeating units had alicyclic structure and all of the repeating units had no norbornane structure showed good results in all of the tests. Among them, those which were less in the proportion of the component having a molecular weight of 2,000 or less were especially good because light transmittance, weathering resistance, chemical resistance, mechanical strength and elongation were highly balanced.

(Composite Film)

Next, explanation will be made of embodiments in which the hydrogenation products of the present invention were used for composite films. Parts and % are by weight, unless otherwise notified. Measurement of (1) glass transition temperature, (2) molecular weight, (3) content of low-molecular weight component, (4) hydrogenation rate, and (5) cis/trans ratio was conducted in the manner as aforementioned. Other evaluation methods are as follows.

Mechanical Strength

Mechanical strength test of the film was conducted in the following manner. A test piece of 30 cm×30 cm was tensioned at a jig exclusively made and then horizontally fixed. An iron ball of 500 g was dropped from vertical direction and it was observed whether the test film was broken or not. The mechanical strength was determined by the number of the tests in which the test film was broken in the tests of ten times.

⊚: The test piece was never broken in the tests of ten times.

○: The test pieces were broken 1–2 times in the tests of ten times.

Δ: The test pieces were broken 3–5 times in the tests of ten times.

—: The test pieces were broken 6–10 times in the tests of ten times.

Chemical Resistance

A cloth soaked with salad oil was applied to ten test films used above in measurement of the mechanical strength, and after holding them for 60 minutes, whitening or cracking was visually observed.

⊚: Whitening or cracking did not occur in any of the ten films.
○: Whitening or cracking occurred in one or two films of the ten films.
Δ: whitening or cracking occurred in three or four films of the ten films.
×: Whitening or cracking occurred in five or more films of the ten films.

Gas Barrier Property

In accordance with JIS K7126 A method (differential pressure method), oxygen permeability (cc/m² 24 hr atm) at 23° C. was measured, and evaluation was conducted by the following criteria.
⊚: The oxygen permeability was lower than 1 cc/m² 24 hr atm.
○: The oxygen permeability was 1 cc/M² 24 hr atm or higher and lower than 10 cc/M² 24 hr atm.
Δ: The oxygen permeability was 10 cc/M² 24 hr atm or higher and lower than 20 cc/M² 24 hr atm.
×: The oxygen permeability was 20 cc/M² 24 hr atm or higher.

Water Vapor Barrier Property

In accordance with JIS Z0208 (cup method), temperature and high humidity conditions of 40° C. and 90% RH was measured, and evaluation was conducted by the following criteria.
⊚: The water vapor permeability was lower than 2 g/m² 24 hr.
○: The water vapor permeability was 2 g/m² 24 hr or higher and lower than 4 g/m² 24 hr.
Δ: The water vapor permeability was 4 g/m² 24 hr or higher and lower than 6 g/m² 24hr.
×: The water vapor permeability was 6 g/m² 24 hr or higher.

Example 37

To 100 parts by weight of the hydrogenation product obtained in Example 3 (hereinafter referred to as "hydrogenation product (k)"; Tg: 103° C.) was added 0.1 part by weight of a phenolic aging inhibitor pentaerythrityl-tetrakis (3-(3,5-di-tertiary-butyl-4-hydroxyphenyl)propionate) as an antioxidant, followed by kneading and pelletizing by a twin-screw extruder at a resin temperature of 250° C. The resulting pellet was called pellet (II-k). As materials for composite films, the pellet (II-k) was used as a cyclic olefin polymer, Eval EP-F101 (manufactured by Kuraray Co., Ltd.; ethylene content: 32 mol %) which was a poly (ethylene-co-vinyl alcohol) was used as a polyvinyl alcohol polymer and an adhesive polypropylene ADMER QF500 (manufactured by Mitsui Petrochemical Industries, Ltd.) was used as an adhesive for adhesive layer. A composite film was produced from these materials by a co-extrusion inflation method for making films using an extruder (K-100 manufactured by Kirion Extruders Incorporated of New Jersey, Verona, U.S.A.). In this case, the lamination was conducted in the order of film(A)/film(C)/film(B) at a film thickness ratio of 50/10/20 to make a composite film having a total thickness of 80 μm (hereinafter referred to as "composite film (II-k)").

Water vapor barrier property, gas barrier property, mechanical strength and chemical resistance of the resulting composite film (II-k) were measured, and the results are shown in Table 7.

Example 38

The polymer (j) obtained in Example 33 was used, and an antioxidant was added thereto as in Example 37, followed by kneading and pelletizing by a twin-screw extruder as in Example 37 to obtain a pellet (II-j). A composite film (II-j) was produced in the same manner as in Example 37, except that the pellet (II-j) as a cyclic olefin polymer was used for the film (A). Water vapor barrier property, gas barrier property, mechanical strength and chemical resistance of the resulting composite film (II-j) were measured, and the results are shown in Table 7.

Example 39

The hydrogenation product (f) obtained in Example 4 was used, and an antioxidant was added thereto as in Example 37, followed by kneading and pelletizing by a twin-screw extruder as in Example 37 to obtain a pellet (II-f). A composite film (II-f) was produced in the same manner as in Example 37, except that the pellet (II-f) as a cyclic olefin polymer was used for the film (A). Water vapor barrier property, gas barrier property, mechanical strength and chemical resistance of the resulting composite film (II-f) were measured, and the results are shown in Table 7.

Example 40

The hydrogenation product (c) obtained in Example 19 was used, and an antioxidant was added thereto as in Example 37, followed by kneading and pelletizing by a twin-screw extruder as in Example 37 to obtain a pellet (II-c). A composite film (II-c) was produced in the same manner as in Example 37, except that the pellet (II-c) as a cyclic polyolefin polymer was used for the film (A) as the material of the composite film. Water vapor barrier property, gas barrier property, mechanical strength and chemical resistance of the resulting composite film (II-c) were measured, and the results are shown in Table 7.

TABLE 7

| | Composite films | Water vapor barrier property | Gas barrier property | Mechanical strength | Chemical strength |
|---|---|---|---|---|---|
| Example 37 | II-k | ⊚ | ⊚ | ⊚ | ⊚ |
| Example 38 | II-j | ⊚ | ⊚ | ⊚ | ○ |
| Example 39 | II-f | ○ | ⊚ | ⊚ | Δ |
| Example 40 | II-c | Δ | ⊚ | Δ | X |

It can be seen from Table 7 that the composite films of the cyclic olefin polymer and the polyvinyl alcohol polymer according to the present invention (Examples 37–39) were excellent in gas barrier property, water vapor barrier property and mechanical strength. It can be seen that among them the composite film produced using the film (A) comprising a cyclic olefin polymer containing many repeating units having no norbornane structure was excellent in water vapor barrier property and chemical resistance. Furthermore, in the case of using cyclic olefin polymers containing 100% of the repeating units having no norbornane and less in the proportion of the component of 1,000 or less in molecular weight (Examples 37 and 38, especially Example 37), gas barrier property, water vapor barrier property, mechanical strength and chemical resistance were highly balanced, and were especially excellent.

(Food Packaging Film)

Next, explanation will be made of embodiments in which the hydrogenation products of the present invention were used for food packaging films. Parts and % are by weight, unless otherwise notified. Measurement of (1) glass transition temperature, (2) molecular weight, (3) content of low-molecular weight component, (4) hydrogenation rate, and (5) cis/trans ratio was conducted in the manner as aforementioned.

Other evaluation methods are as follows.

Mechanical Strength

A test piece of the resulting film of 30 cm ×30 cm (thickness: 50 μm) was tensioned at a jig exclusively made and then horizontally fixed. An iron ball of 100 g was dropped from vertical direction and it was observed whether the test film was broken or not. The mechanical strength was determined by the number of the tests in which the test film was broken in the tests of ten times.

⊚: The test pieces were never broken in the tests of ten times.

◯: The test pieces were broken 1–2 times in the tests of ten times.

Δ: The test pieces were broken 3–5 times in the tests of ten times.

×: The test pieces were broken 6–10 times in the tests of ten times.

Tensile Elongation

This was measured in accordance with JIS 7127, and evaluation was conducted by the following criteria.

⊚: 10% or more

◯: 5% or more and less than 10%

Δ: 1% or more and less than 5%

×: less than 1%

Oil Resistance

A cloth soaked with salad oil was applied to ten test films used above in the measurement of the mechanical strength, and after holding them for 60 minutes, whitening or cracking was visually observed.

⊚: Whitening or cracking did not occur in any of the ten films.

◯: Whitening or cracking occurred in one or two films of the ten films.

Δ: Whitening or cracking occurred in three or four films of the ten films.

×: Whitening or cracking occurred in five or more films of the ten films.

Water Vapor Barrier Property

In accordance with JIS Z0208 (cup method), water vapor permeability (g/m$^2$·24 hr) under the high temperature and constant humidity conditions of 40° C. and 90% RH was measured, and evaluation was conducted by the following criteria.

⊚: The water vapor permeability was lower than 2 g/M$^2$ 24 hr.

◯: The water vapor permeability was 2 g/m$^2$ 24 hr or higher and lower than 4 gm/$^2$·24 hr.

Δ: The water vapor permeability was 4 g/m$^2$ 24 hr or higher and lower than 6 g/m$^2$·24hr.

×: The water vapor permeability was 6 g/m$^2$ 24 hr or higher.

Freshness Keeping Test

The resulting two films were cut to 30 cm×50 cm square, and they were put one upon another and three sides thereof were heat-sealed to make a bag. A fresh Chinese cabbage was put in the bag and the opening was heat-sealed to hermetically seal up the bag. The bag in this state was stored in a refrigerator for 1 week, and when the surface of the Chinese cabbage did not dry or it did not droop, this was judged to be good.

Transparency

The total light transmittance was measured by an absorbance meter, and when the total light transmittance was 90% or higher, this was judged to be good.

Examples 41–43

0.02 Part by weight of a phenolic aging inhibitor pentaerythrityl-tetrakis(3-(3,5-di-tertiary-butyl-4-hydroxyphenyl)propionate) as an antioxidant was added to 100 parts by weight of each of the hydrogenation product (b) obtained in Example 14, the hydrogenation product (f) obtained in Example 4, and APL-6509T (manufactured by Mitsui Chemical Co., Ltd.; 20% by weight of repeating units having alicyclic structure and other repeating units being ethylene; hereinafter referred to as "polymer (1)"). Each of the resulting mixtures was extruded from a T-die of 400 mm in width of an extruder of screw diameter 65 mm at a resin temperature of 260° C., and taken-off by a roll of 85° C. to obtain a resin film of 100 μm thick. The resin films obtained from the hydrogenation product (b), the hydrogenation product (f) and the polymer (1) were called (III-b), (III-f) and (III-1), respectively.

Mechanical strength, elongation, water vapor barrier property and oil resistance of the resin films (III-b), (III-f) and (III-1) were measured, and the results are shown in Table 8. All of the films were excellent in transparency and freshness keeping test.

TABLE 8

|  | Resin films | Mechanical strength | Elongation | Water vapor barrier property | Chemical resistance |
|---|---|---|---|---|---|
| Example 41 | III-b | ⊚ | ⊚ | ⊚ | ⊚ |
| Example 42 | III-f | ⊚ | ⊚ | ◯ | ⊚ |
| Example 43 | III-l | Δ | Δ | ⊚ | X |

It can be seen from Table 8 that the films obtained from the thermoplastic dicyclopentadiene ring-opening polymers of the present invention (Examples 41 and 42) showed good results in all of the tests. It can also be seen that among the thermoplastic dicyclopentadiene ring-opening polymers, those which were greater in % by weight of the repeating units having alicyclic structure (Examples 41 and 42: 100% by weight) were superior to those which were less in repeating units having alicyclic structure (Examples 43: 20% by weight) in mechanical strength, elongation and oil resistance. It can be further seen that among the films comprising the thermoplastic dicyclopentadiene ring-opening polymers having 100% by weight of repeating. units of alicyclic structure (Examples 41 and 42), the film larger in the amount of the repeating units having no norbornane structure was especially excellent (Example 41>Example 42).

Examples 44–46

0.1 Part by weight of a phenolic aging inhibitor pentaerythrityl-tetrakis(3-(3,5-di-tertiary-butyl-4-hydroxyphenyl)propionate) as an antioxidant was added to 100 parts by weight of each of the hydrogenation product (h) obtained in Example 31, the hydrogenation product (i) obtained in Example 32, and the hydrogenation product obtained in Example 11 (hereinafter referred to as "hydrogenation product (m)"). Each of the resulting mixtures was extruded from a T-die of 400 mm in width of an extruder of screw diameter 65 mm at a resin temperature of 260° C., and taken-off by a roll of 85° C. to obtain a resin film of 50 μm thick. The resin films obtained from the hydrogenation products (h), (i) and (m) were called (III-h), (III-i) and (III-m), respectively.

Mechanical strength, elongation, water vapor barrier property and oil resistance of the resin films (III-h), (III-i) and (III-m) were measured, and the results are shown in Table 9.

TABLE 9

| | Resin films | Mechanical strength | Elongation | Water vapor barrier property | Chemical resistance |
|---|---|---|---|---|---|
| Example 44 | III-h | ⊚ | ⊚ | ⊚ | ⊚ |
| Example 45 | III-i | ◯ | ⊚ | ⊚ | ⊚ |
| Example 46 | III-m | X | X | ⊚ | ◯ |

In the case of using the thermoplastic dicyclopentadiene ring-opening polymers in which all of the repeating units had alicyclic structure and all of these repeating units had no norbornane structure, the resulting films showed good results in all of the tests. Among them, when the proportion of the component having a molecular weight of 1,000 or less in the thermoplastic dicyclopentadiene ring-opening polymers was small, mechanical strength, elongation, water vapor barrier property and oil resistance were highly balanced, and this was especially good.

(Durable Plate Members)

Next, explanation will be made of embodiments in which the hydrogenation products of the present invention were used for durable plate members. Parts and % are by weight, unless otherwise notified. measurement of (1) glass transition temperature, (2) molecular weight, (3) content of low-molecular weight component, (4) hydrogenation rate, and (5) cis/trans ratio was conducted in the manner as aforementioned. Other evaluation methods are as follows.

Mechanical Strength

A missile-shaped bullet of ¾ inch in radius (50 g) was dropped under gravity on the resulting plate from the height of 1 m, and it was observed whether the plate was fractured or cracked. When none of the ten plates were fractured or cracked, this is indicated by ⊚ (very good); when one to three plates of the ten plates were fractured or cracked, this is indicated by ◯ (good); when four to six plates of the ten plates were fractured or cracked, this is indicated by Δ (somewhat bad); and when seven or more plates of the ten plates were fractured or cracked, this is indicated by × (bad).

Tensile Elongation

This was measured in accordance with JIS 7127, and evaluation was conducted by the following criteria.

⊚: 10% or more
◯: 5% or more and less than 10%
Δ: 1% or more and less than 5%
×: less than 1%

Light Transmission

Total light transmittance was measured by an absorbance photometer, and was evaluated by the following criteria.

⊚: The total light transmittance was 90% or higher.
◯: The total light transmittance was 80% or higher and lower than 90%.
Δ: The total light transmittance was 50% or higher and lower than 80%.
×: The total light transmittance was lower than 50%.

Weathering Resistance

Weathering resistance test on the plate was conducted by the following methods.

(1) The test piece was exposed to carbon arc for a given period of time with making one revolution of the test piece per 1 minute round the light source in accordance with JIS 5400 using a sunshine weatherometer under the conditions of a black panel temperature of 35° C. with rainfall (18 minutes/120 minutes). The weathering resistance was evaluated in terms of reduction of total light transmittance of the plate after the test, and judged according to the following criteria.

⊚: Reduction of the total light transmittance was less than 0.1%.
◯: Reduction of the total light transmittance was 0.1%-10%.
Δ: Reduction of the total light transmittance was 10%–30%.
×: Reduction of the total light transmittance was 30% or more.

(2) The surface state of the plate after subjected to outdoor exposure for 10 months and 20 months was visually observed.

⊚: The plate had no haze and no yellowishness, and was transparent.
◯: The plate had no haze and had yellowishness, but was transparent.
Δ: The plate had haze and yellowishness, but was slightly transparent.
×: The plate had haze and yellowishness, and was opaque.

Chemical Resistance

A cloth soaked with salad oil was applied to the test piece, and after keeping them for 60 minutes, solvent cracks which occurred were visually observed to test the chemical resistance. When neither white flaws nor discoloration occurred, this was judged to be good.

Maximum Deflection

A strip-shaped test piece of 40 mm in width and 100 mm in length was prepared, and a concentrated load of 5 g was applied to a free end of the cantilever, and the maximum deflection (mm) in vertical direction was measured.

Examples 47–49

The hydrogenation product (b) obtained in Example 14, the hydrogenation product (f) obtained in Example 4, and APL-6509T (manufactured by Mitsui Chemical Co., Ltd.; containing 30% by weight of repeating units having alicyclic structure, and other repeating units being ethylene; hereinafter referred to as "polymer (n)") were used, and to 100 parts by weight of each of these resin components were added 0.1 part by weight of a phenolic aging inhibitor pentaerythrityl-tetrakis(3-(3,5-di-tertiary-butyl-4-hydroxyphenyl)propionate) as an antioxidant, 0.3 part by weight of Cyasorb UV-3346 (manufactured by Cypro. Kasei Co., Ltd.) as a light stabilizer, and 0.2 part by weight of SEESORB 709 (manufactured by Cypro Kasei Co., Ltd.) as an ultraviolet absorber. Each of the resulting mixtures was extruded by an extruder provided with a T-die at a resin temperature of 260° C., and passed between polishing rolls to make a resin plate of 10 mm in thickness and 1000 mm in width. The resin plates obtained from the hydrogenation product (b), the hydrogenation product (f) and the polymer (n) were called (IV-b), (IV-f) and (IV-n), respectively.

Weathering resistance, chemical resistance, mechanical strength, elongation and light transmittance of the resin plates (IV-b), (IV-f) and (IV-n) were measured, and the results are shown in Table 10. The maximum deflections of the resinplates (IV-b), (IV-f) and (IV-n) were all 1 mm or less.

Examples 50–52

The hydrogenation product (h) obtained in Example 31, the hydrogenation product (i) obtained in Example 32, and the hydrogenation product (m) obtained in Example 11 were used, and to 100 parts by weight of each of these resin components were added 0.1 part by weight of a phenolic aging inhibitor pentaerythrityl-tetrakis(3-(3,5-di-tertiary-butyl-4-hydroxyphenyl)propionate) as an antioxidant, 0.3 part by weight of Cyasorb UV-3346 (manufactured by Cypro Kasei Co., Ltd.) as a light stabilizer, and 0.2 part by weight of SEESORB 709 (manufactured by Cypro Kasei Co., Ltd.) as an ultraviolet absorber. Each of the resulting mixtures was extruded by an extruder provided with a T-die at a resin temperature of 260° C., and passed between polishing rolls to make a resin plate of 10 mm in thickness and 1000 mm in width. The resin plates obtained from the hydrogenation products (h), (i) and (m) were called resin plates (IV-h), (IV-i) and (IV-m), respectively.

Weathering resistance, chemical resistance, mechanical strength, elongation and light transmittance of the resin plates (IV-h), (IV-i) and (IV-m) were measured, and the results are shown in Table 11. The maximum deflections of the resin plates (IV-h), (IV-i) and (IV-m) were all 1 mm or less.

from the thermoplastic dicyclopentadiene ring-opening polymers having less proportion of the component of 1000 or less in molecular weight had highly balanced weathering resistance, chemical resistance, mechanical strength and elongation and were especially excellent.

INDUSTRIAL APPLICABILITY

According to the present invention, there are provided thermoplastic dicyclopentadiene ring-opening polymers which are high in productivity at polymerization, less in catalyst residue wastes, high in activity of subsequent hydrogenation reaction, and excellent in moldability when used as molding materials after the hydrogenation reaction, and a method for producing the same.

Since the thermoplastic dicyclopentadiene ring-opening polymers of the present invention are high in the proportion of cis-bond unit, they are readily dissolved in saturated hydrocarbon solvents, and can be subjected to efficient hydrogenation reaction, and hydrogenation products excellent in mechanical strength can be obtained. Furthermore, the thermoplastic dicyclopentadiene ring-opening polymers

TABLE 10

| | Plates | Weathering resistance (1) | Weathering resistance (2) | | Chemical resistance | Mechanical strength | Elongation | Light transmission |
| --- | --- | --- | --- | --- | --- | --- | --- | --- |
| | | | 10 months | 20 months | | | | |
| Example 47 | IV-b | ⊚ | ⊚ | ⊚ | ⊚ | ⊚ | ⊚ | ⊚ |
| Example 48 | IV-f | ⊚ | ⊚ | ○ | ⊚ | ⊚ | ⊚ | ⊚ |
| Example 49 | IV-n | ○ | ○ | △ | △ | △ | △ | ○ |

It can be seen from Table 10 that the plates obtained from the thermoplastic dicyclopentadiene ring-opening polymers of the present invention showed good results in all of the tests. It can also be seen that among all of the thermoplastic dicyclopentadiene ring-opening polymers, those which were greater in % by weight of the repeating units having alicyclic structure (Examples 47 and 48: 100% by weight) were superior to those which were less in repeating units having alicyclic structure (Examples 49: 30% by weight) in all of weathering resistance, chemical resistance, mechanical strength and light transmittance. It can be further seen that among the plates comprising the thermoplastic dicyclopentadiene ring-opening polymers having 100% by weight of repeating units of alicyclic structure (Examples 47 and 48), the plate larger in the content of repeating units having no norbornane structure was especially excellent (Example 47>Example 48).

of the present invention are reduced in contents of oligomers by the presence of reaction regulators, and, hence, are excellent in mechanical strength, moldability and hydrogenation rate.

The thermoplastic dicyclopentadiene ring-opening polymers and their hydrogenation products of the present invention can be applied to a wide variety of the fields such as molded products for optical use, molded products for medical use, molded products for electronic use, and packaging materials.

That is, the present invention provides wire coating materials excellent in flexing resistance, flexibility, processability and mechanical characteristics, and cyclic olefin polymers for the wire coating materials, and further provides electric wires using the wire coating materials.

The present invention provides thermoplastic resin plate lenses excellent in mechanical strength, having high

TABLE 11

| | Plates | Weathering resistance (1) | Weathering resistance (2) | | Chemical resistance | Mechanical strength | Elongation | Light transmission |
| --- | --- | --- | --- | --- | --- | --- | --- | --- |
| | | | 10 months | 20 months | | | | |
| Example 50 | IV-b | ⊚ | ⊚ | ⊚ | ⊚ | ⊚ | ⊚ | ⊚ |
| Example 51 | IV-i | ⊚ | ⊚ | ⊚ | ⊚ | ○ | ⊚ | ⊚ |
| Example 52 | IV-m | ⊚ | ⊚ | ⊚ | ○ | X | X | ⊚ |

As can be seen from Table 11, the plates obtained from the thermoplastic dicyclopentadiene ring-opening polymers in which all of the repeating units had alicyclic structure and all of the repeating units had no norbornane structure showed good results in all of the tests. Among them, those made resolution, and less in reduction of optical performances due to change of environment, and a method for making them. As preferred plate lenses of the present invention, mention may be made of Fresnel lenses and lenticular lenses. The Fresnel lenses can be used for recording and reproduction by recording media for music and information such as compact disks, CD-ROM, digital video disks, laser disks and MO; reading of information by bar code reader, and magnification and reduction such as magnifying glass. Furthermore, the present invention can provide lenticular lenses which have characteristics such as mechanical strength, impact strength, low water absorption and light weight, and, hence, hardly deform due to the influence of environmental temperature and humidity, and show no distortion of images or blur of color when used for large-sized picture displays. Thus, the-lenticular lenses of the present invention are useful for information display devices such as screens for projection televisions or video projection.

Agricultural films containing hydrogenation products of the thermoplastic dicyclopentadiene ring-opening polymers of the present invention have highly balanced mechanical strength, elongation, chemical resistance, weathering resistance and light transmittance. Especially, these characteristics are highly balanced when the repeating units have no norbornane structure. Moreover, since they contain no halogen atoms, there are no problems such as environmental destruction caused by generation of harmful gas at incineration.

The composite films of the present invention have highly balanced gas barrier property, water vapor barrier property, mechanical strength and chemical resistance. Especially, when only DPC monomers are used as cyclic polymer film (A), gas barrier property, water vapor barrier property, mechanical strength and chemical resistance are very excellent and are highly balanced.

The food packaging films of the present invention comprising the thermoplastic dicyclopentadiene ring-opening polymers having repeating units having a specific alicyclic structure have good and well-balanced mechanical strength, elongation, oil resistance, transparency and water vapor barrier property. Moreover, since they contain no halogen atoms, there are no problems such as environmental destruction caused by generation of harmful gas at incineration. Therefore, the food packaging films of the present invention are widely used as packaging materials for perishable foods such as vegetables, fruits, meats and fishes, frozen foods, and other many foods such as cereals, cakes and breads.

By using the thermoplastic DPC ring-opening polymers of the present invention, there are provided impact resistant plate members excellent in mechanical strength, elongation, chemical resistance, weathering resistance and light transmittance. Furthermore, according to the present invention, there are provided impact resistance plate members excellent in transparency and suitable for outdoor use. Since the impact resistant plate materials of the present invention are excellent in the above characteristics, they are useful as carport and housing exteriors.

What is claimed is:

1. A thermoplastic dicyclopentadiene ring-opening polymer obtained by ring-opening polymerization of a monomer component containing a dicyclopentadiene monomer, characterized in that polycyclic rings which are repeating units of the polymer are bonded in cis-position relative to the carbon-carbon double bond of the main chain of the polymer in 50 mol % or more of the repeating units based on the total repeating units and the content of a low-molecular weight component of 2,000 or less in molecular weight is 10% by weight or less based on the total polymer components.

2. A thermoplastic dicyclopentadiene ring-opening polymer according to claim 1, wherein the dicyclopentadiene monomer is a dicyclopentadiene or a derivative thereof represented by the following formula (1):

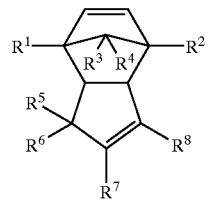

3. A thermoplastic dicyclopentadiene ring-opening polymer according to claim 1, wherein the monomer component additionally contains a ring-opening copolymerizable other norbornene monomer in an amount of 40% by weight or less based on the total amount of the monomers.

4. A method for producing a thermoplastic dicyclopentadiene ring-opening polymer by ring-opening polymerization of a monomer component containing a dicyclopentadiene monomer in an organic solvent in the presence of a ring-opening polymerization catalyst, characterized in that the ring-opening polymerization is carried out in the presence of at least one compound selected from the group consisting of a nitrile, a ketone, an ether and an ester as a reaction regulator and an alcohol as a polymerization activity regulator.

5. A method for producing a thermoplastic dicyclopentadiene ring-opening polymer according to claim 4, wherein a metathesis catalyst system comprising a tungsten compound or a molybdenum compound and an organoaluminum compound is used as the ring-opening polymerization catalyst.

6. A hydrogenation product obtained by hydrogenating the carbon-carbon unsaturated bond of the thermoplastic dicyclopentadiene ring-opening polymer of claim 1.

7. A wire coating material containing the hydrogenation product of claim 6.

8. An electric wire comprising a conductor and the wire coating material of claim 7 which is provided on the outer peripheral surface of the conductor.

9. A plate lens containing the hydrogenation product of claim 6.

10. A plate lens according to claim 9, which is a Fresnel lens or a lenticular lens.

11. A method for producing a plate lens which includes a step of making the hydrogenation product of claim 6 to a sheet by a melt extrusion method and a step of making the resulting sheet to a plate lens by compression molding.

12. An agricultural film containing the hydrogenation product of claim 6.

13. A composite film including at least one layer of film (A) comprising the hydrogenation product of claim 6 and at least one layer of film (B) comprising a polyvinyl alcohol polymer.

14. A composite film according to claim 13, wherein an adhesive layer (C) is provided between the film (A) and the film (B).

15. A method for producing a composite film which comprises laminating a film (B) comprising a polyvinyl alcohol polymer on at least one side of a film (A) comprising a hydrogenation product of claim 6 with or without providing an adhesive layer (C) on the side of the film (A) and then contact bonding them with heating.

16. A method for producing a composite film which comprises co-extrusion molding the hydrogenation product of claim 6, a polyvinyl alcohol polymer and optionally an adhesive.

17. A food packaging film containing the hydrogenation product of claim 6.

18. An impact resistant plate member containing the hydrogenation product of claim 6.

19. An impact resistant plate member according to claim 18, wherein the plate has a thickness of 0.5–500 mm.

20. An impact resistant plate member according to claim 18, wherein when a concentrated load of 5 g is applied to a free end of a cantilever of a strip-shaped test piece of 40 mm in width and 100 mm in length, the maximum deflection is 80 mm or less.

21. An impact resistant plate member according to claim 18, which is a transparent plate member.

22. An impact resistant plate member according to claim 18, which is for outdoor use.

23. A method for producing an impact resistance plate member of claim 18, which comprises molding by a melt extrusion method using a T-die.

* * * * *